(12) United States Patent
Shao et al.

(10) Patent No.: US 12,530,638 B2
(45) Date of Patent: *Jan. 20, 2026

(54) METHOD AND SYSTEM FOR SCHEDULING OPERATION AND MAINTENANCE PERSONNEL BASED ON INTERNET OF THINGS (IOT) SYSTEM FOR SMART GAS INSTALLATION MANAGEMENT

(71) Applicant: CHENGDU QINCHUAN IOT TECHNOLOGY CO., LTD., Sichuan (CN)

(72) Inventors: Zehua Shao, Chengdu (CN); Junyan Zhou, Chengdu (CN); Xiaojun Wei, Chengdu (CN); Lei Zhang, Chengdu (CN); Yong Li, Chengdu (CN); Yongzeng Liang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 77 days.

This patent is subject to a terminal disclaimer.

(21) Appl. No.: 18/587,889

(22) Filed: Feb. 26, 2024

(65) Prior Publication Data

US 2024/0193503 A1 Jun. 13, 2024

Related U.S. Application Data

(63) Continuation-in-part of application No. 18/152,175, filed on Jan. 10, 2023, now abandoned, and a
(Continued)

(30) Foreign Application Priority Data

Oct. 14, 2022 (CN) .......................... 202211256360.9
Dec. 21, 2022 (CN) .......................... 202211644553.1

(51) Int. Cl.
*G06Q 10/0631* (2023.01)
*G06Q 10/20* (2023.01)
(Continued)

(52) U.S. Cl.
CPC .................. *G06Q 10/06311* (2013.01); *G06Q 10/06315* (2013.01); *G06Q 10/20* (2013.01);
(Continued)

(58) Field of Classification Search
CPC ....... G06Q 10/06311; G06Q 10/06315; G06Q 10/20; G16Y 10/35
See application file for complete search history.

(56) References Cited

U.S. PATENT DOCUMENTS 10,229,394 B1 * 3/2019 Davis .................. H04L 41/5074
2002/0065700 A1 5/2002 Powell et al.
(Continued)

FOREIGN PATENT DOCUMENTS

CN 107809456 A 3/2018
CN 107835209 A 3/2018
(Continued)

OTHER PUBLICATIONS

First Office Action in Chinese Application No. 202211644553.1 mailed on Feb. 4, 2023, 25 pages.
(Continued)

*Primary Examiner* — Nadja N Chong Cruz
(74) *Attorney, Agent, or Firm* — METIS IP LLC

(57) ABSTRACT

The embodiments of the present disclosure provide methods and systems for scheduling operation and maintenance personnel based on an Internet of Things (IoT) system for smart gas installation management. The method may include: obtaining user installation information of at least one operation and maintenance area; determining target installation information of the at least one operation and maintenance
(Continued)

area; determining a door-to-door service plan for the at least one operation and maintenance area; obtaining collection data of a gas device configured in the operation and maintenance area; determining a count of on-call personnel of the at least one operation and maintenance area; determining a scheduling capability value of the at least one operation and maintenance area; determining a real-time scheduling instruction; and in response to compensation time off information, updating the scheduling capability value, and adjusting the real-time scheduling instruction.

18 Claims, 6 Drawing Sheets

Related U.S. Application Data continuation-in-part of application No. 18/052,195, filed on Nov. 2, 2022, now Pat. No. 11,928,623.

(51) Int. Cl.
    *G06Q 50/06*     (2012.01)
    *G16Y 10/35*     (2020.01)
    *G16Y 40/10*     (2020.01)

(52) U.S. Cl.
    CPC ............. *G06Q 50/06* (2013.01); *G16Y 10/35* (2020.01); *G16Y 40/10* (2020.01)

(56) References Cited

U.S. PATENT DOCUMENTS

| | | | |
|---|---|---|---|
| 2002/0169622 A1 | 11/2002 | Estridge, Jr. | |
| 2008/0059278 A1 | 3/2008 | Medina et al. | |
| 2010/0250312 A1* | 9/2010 | Tarabzouni | G06Q 50/06 709/200 |
| 2014/0172482 A1* | 6/2014 | Mitchell | G06Q 10/0631 705/7.15 |
| 2015/0274421 A1 | 10/2015 | Yamada | |
| 2016/0196519 A1 | 7/2016 | Voyentzie | |
| 2019/0072966 A1 | 3/2019 | Zhang et al. | |
| 2020/0293997 A1* | 9/2020 | Shao | G08B 21/18 |
| 2021/0134075 A1* | 5/2021 | Carpenter | G07C 5/006 |
| 2022/0134562 A1 | 5/2022 | Graham et al. | |
| 2023/0108309 A1 | 4/2023 | Shao et al. | |
| 2023/0125033 A1 | 4/2023 | Shao et al. | |

FOREIGN PATENT DOCUMENTS

| | | |
|---|---|---|
| CN | 111598323 A | 8/2020 |
| CN | 112799365 A | 5/2021 |
| CN | 113159803 A | 7/2021 |
| CN | 114118868 A | 3/2022 |
| CN | 114565128 A | 5/2022 |
| CN | 114677043 A | 6/2022 |
| CN | 115050169 A | 9/2022 |
| JP | 2014199552 A | 10/2014 |

OTHER PUBLICATIONS

First Office Action in Chinese Application No. 202211256360.9 mailed on Dec. 7, 2022, 26 pages.
"Xinzhongyoushu", Web page <https://mp.weixin.qq.com/s/8fVcCuYmt3LJSQY12LuqSQ>, 2021, 15 pages.
Qiao, Wukang et al., Construction of Smart Gas System Based On the Internet of Everything, Innovation World Weekly, 2019, 9 pages.
Hu, Wenjing, Research and Development of Integrated Intelligent Dynamic Dispatching System for Urban Gas Inspection and Repair, Dissertation Submitted to Zhejiang University of Technology, 2021, 98 pages.
"Installation Guide, Service Line Installation Standards", Web page <https://www.peoples-gas.com/plumbers/files/Installation_Guide.pdf>, 2020, 66 pages.
Ravindra Parmar, Common Loss Functions in Machine Learning, Towards Data Science, 2018, 14 pages.

* cited by examiner

METHOD AND SYSTEM FOR SCHEDULING OPERATION AND MAINTENANCE PERSONNEL BASED ON INTERNET OF THINGS (IOT) SYSTEM FOR SMART GAS INSTALLATION MANAGEMENT

CROSS-REFERENCE TO RELATED APPLICATIONS

This application is a Continuation-in-part of U.S. application Ser. No. 18/152,175, filed on Jan. 10, 2023, which claims priority of Chinese Patent Application No. 202211644553.1, filed on Dec. 21, 2022, and this application is also a Continuation-in-part of U.S. application Ser. No. 18/052,195, filed on Nov. 2, 2022, which claims priority of Chinese Patent Application No. 202211256360.9, filed on Oct. 14, 2022, the entire contents of each of which are hereby incorporated by reference.

TECHNICAL FIELD

The present disclosure relates to field of smart gas, and in particular to methods and Internet of Things systems for smart gas installation management.

BACKGROUND

In some scenarios, such as when moving into a new building, a user usually needs to submit a gas installation. The existing gas installation process is usually performed manually and the process is cumbersome. In addition, due to the limited count of operation and maintenance personnel for gas installation, when the demand for gas installations is large, it is easy to have unreasonable arrangements of door-to-door service plans of gas installation, such as an unreasonable count of operation and maintenance personnel, a conflicting door-to-door service time, and an unreasonable service arrangement, which leads to a relatively long waiting time, etc. for a user.

Therefore, it is desirable to provide a method and a system for scheduling operation and maintenance personnel based on an Internet of Things (IoT) system for smart gas installation management.

SUMMARY

According to one or more embodiments of the present disclosure, a method for scheduling operation and maintenance personnel based on an Internet of Things (IoT) system for smart gas installation management is provided. The Internet of Things system includes a smart gas user platform, a smart gas service platform, a smart gas operation management platform, a smart gas sensor network platform, and a smart gas object platform that interact in sequence, the smart gas object platform includes a smart gas indoor installation engineering object sub-platform and a smart gas indoor device object sub-platform. The method is implemented based on the smart gas operation management platform and may include: obtaining user installation information of at least one operation and maintenance area uploaded by the smart gas user platform through the smart gas service platform; determining, based on the user installation information and an acceptance condition, target installation information of the at least one operation and maintenance area, generating a personnel query instruction, and sending the personnel query instruction to the smart gas indoor installation engineering object sub-platform for execution, the personnel query instruction being used to obtain an operation and maintenance personnel scheduling condition of the at least one operation and maintenance area; determining, based on the target installation information and the operation and maintenance personnel scheduling condition, a door-to-door service plan for the at least one operation and maintenance area, the door-to-door service plan including a door-to-door time, door-to-door personnel, and a door-to-door service content corresponding to the target installation information; determining, based on the target installation information and a historical comprehensive count of on-call personnel of the at least one operation and maintenance area, an important point and a secondary point of the at least one operation and maintenance area, as well as a first collection frequency of a gas metering device configured at the important point, and a second collection frequency of a gas metering device configured at the secondary point; wherein the important point is related to a target installation address corresponding to the target installation information, and the secondary point is related to other reporting location in the operation and maintenance area; obtaining collection data of a gas device configured in the operation and maintenance area uploaded by the smart gas indoor device object sub-platform through the smart gas sensor network platform, and determining a gas-related feature of the operation and maintenance area based on the collection data; determining a count of on-call personnel of the at least one operation and maintenance area based on the gas-related feature of the at least one operation and maintenance area, the target installation information, and the door-to-door service plan; in response to a determination that there is at least one operation and maintenance area satisfying a preset scheduling condition, determining a scheduling capability value of the at least one operation and maintenance area; the scheduling capability value reflecting an ability to dispatch operation and maintenance personnel to other operation and maintenance areas; based on the scheduling capability value of the at least one operation and maintenance area, determining a real-time scheduling instruction and issuing the real-time scheduling instruction to the smart gas indoor installation engineering object sub-platform for execution, the real-time scheduling instruction including scheduling arrangement for on-call personnel in different operation and maintenance areas; and in response to compensation time off information uploaded by the smart gas indoor installation engineering object sub-platform, updating the scheduling capability value of the at least one operation and maintenance area, and adjusting the real-time scheduling instruction.

According to one or more embodiments of the present disclosure, a system for scheduling operation and maintenance personnel based on an Internet of Things (IoT) system for smart gas installation management is provided. The Internet of Things system may include a smart gas user platform, a smart gas service platform, a smart gas operation management platform, a smart gas sensor network platform, and a smart gas object platform that interact in sequence. The smart gas object platform includes a smart gas indoor installation engineering object sub-platform and a smart gas indoor device object sub-platform. The smart gas operation management platform may be configured to: obtain user installation information of at least one operation and maintenance area uploaded by the smart gas user platform through the smart gas service platform; determine, based on the user installation information and an acceptance condition, target installation information of the at least one operation and maintenance area, generate a personnel query instruction, and send the personnel query instruction to the smart gas indoor installation engineering object sub-platform for execution, the personnel query instruction being used to obtain an operation and maintenance personnel scheduling condition of the at least one operation and maintenance area; determine, based on the target installation information and the operation and maintenance personnel scheduling condition, a door-to-door service plan for the at least one operation and maintenance area, the door-to-door service plan including a door-to-door time, door-to-door personnel, and a door-to-door service content corresponding to the target installation information; determine, based on the target installation information and a historical comprehensive count of on-call personnel of the at least one operation and maintenance area, an important point and a secondary point of the at least one operation and maintenance area, as well as a first collection frequency of a gas metering device configured at the important point, and a second collection frequency of a gas metering device configured at the secondary point; wherein the important point is related to a target installation address corresponding to the target installation information, and the secondary point is related to other reporting location in the operation and maintenance area; obtain collection data of a gas device configured in the operation and maintenance area uploaded by the smart gas indoor device object sub-platform through the smart gas sensor network platform, and determine a gas-related feature of the operation and maintenance area based on the collection data; determine a count of on-call personnel of the at least one operation and maintenance area based on the gas-related feature of the at least one operation and maintenance area, the target installation information, and the door-to-door service plan; in response to a determination that there is at least one operation and maintenance area satisfying a preset scheduling condition, determine a scheduling capability value of the at least one operation and maintenance area; the scheduling capability value reflecting an ability to dispatch operation and maintenance personnel to other operation and maintenance areas; based on the scheduling capability value of the at least one operation and maintenance area, determine a real-time scheduling instruction and issue the real-time scheduling instruction to the smart gas indoor installation engineering object sub-platform for execution, the real-time scheduling instruction including scheduling arrangement for on-call personnel in different operation and maintenance areas; and in response to compensation time off information uploaded by the smart gas indoor installation engineering object sub-platform, update the scheduling capability value of the at least one operation and maintenance area, and adjust the real-time scheduling instruction.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein.

DETAILED DESCRIPTION

Figure 1:
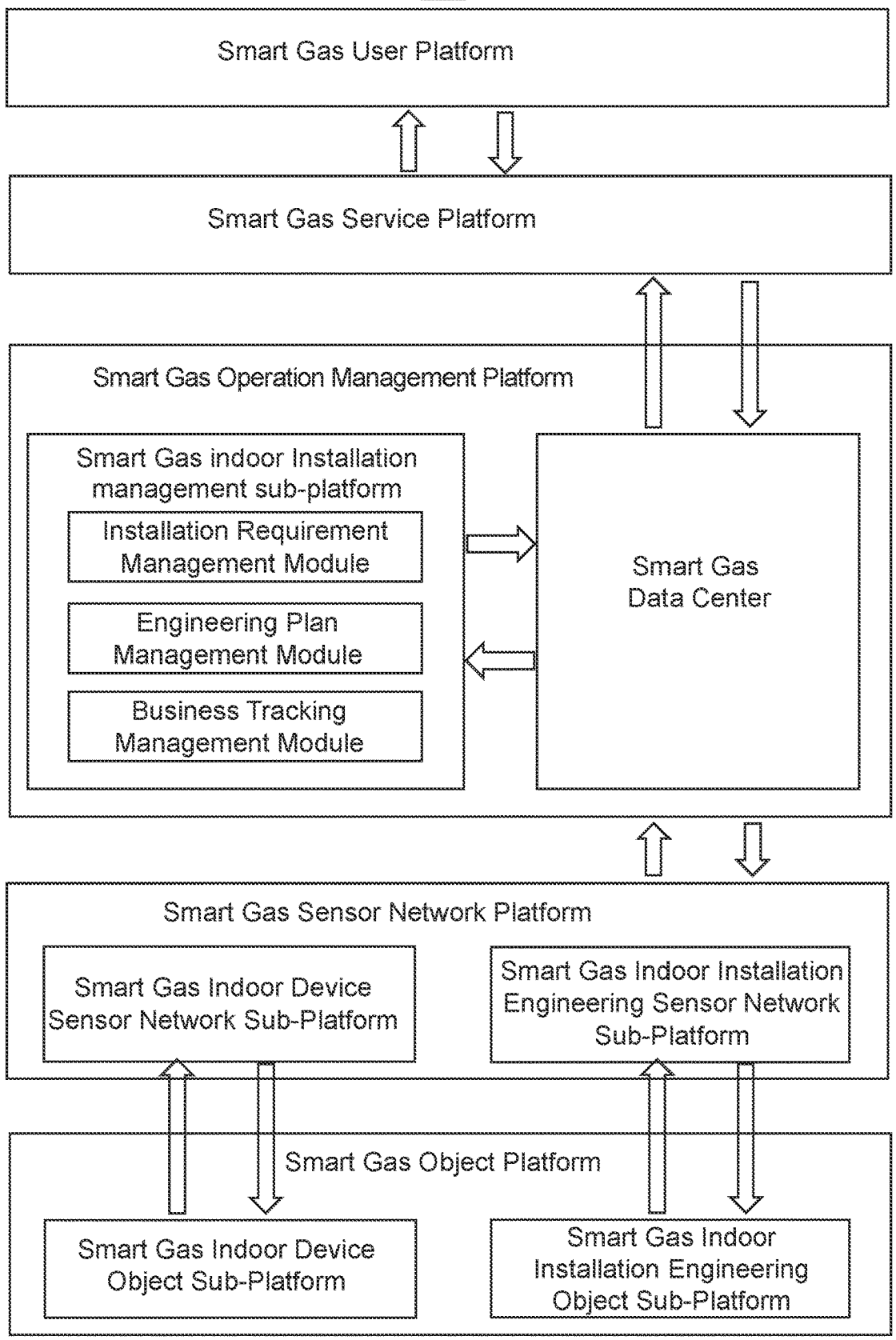
FIG. 1 is a structure diagram illustrating an exemplary platform of an Internet of Things system for smart gas installation management according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

FIG. 1 is a structure diagram illustrating an exemplary platform of an Internet of Things system for smart gas installation management according to some embodiments of the present disclosure. As shown in FIG. 1, the Internet of Things system 100 for smart gas installation management may include a smart gas user platform, a smart gas service platform, a smart gas operation management platform, a smart gas sensor network platform, and a smart gas object platform that interact in sequence.

The smart gas user platform may be a platform configured to interact with a user. The user may be a gas user. In some embodiments, the smart gas user platform may be configured as a terminal device. For example, the terminal device may include a desktop computer, a tablet computer, a laptop computer, a mobile phone, and other smart electronic devices that implement data processing and data communication, which is not much limited herein. In some embodiments, the smart gas user platform may obtain user requirement information through the terminal device, for example, obtain user installation information input by the user.

In some embodiments, the smart gas user platform may interact with the smart gas service platform. For example, the smart gas user platform may transmit the user installation information to the smart gas service platform. As another example, the smart gas user platform may be configured to receive a door-to-door service plan transmitted by the smart gas service platform.

The smart gas service platform may be a platform for receiving and transmitting data and/or information. The smart gas service platform may interact with the smart gas user platform and the smart gas operation management platform. For example, the smart gas service platform may transmit the user installation information to the smart gas operation management platform. As another example, the smart gas service platform may receive the door-to-door service plan transmitted by the smart gas operation management platform.

The smart gas operation management platform may be a platform for overall planning and coordinating connections and collaboration among a plurality of function platforms. In some embodiments, the smart gas operation management platform may include a smart gas data center and a smart gas indoor installation management sub-platform. The smart gas indoor installation management sub-platform may interact with the smart gas data center in a bidirectional manner.

The smart gas data center may aggregate and store all operation data of the Internet of Things system 100 for smart gas installation management. In some embodiments, the smart gas operation management platform may interact with the smart gas sensor network platform and the smart gas service platform through the smart gas data center. For example, the smart gas data center may receive the user installation information from the smart gas service platform and transmit the user installation information to the smart gas indoor installation management sub-platform for processing. As another example, the smart gas data center may receive processed data (e.g., the door-to-door service plan) from the smart gas indoor installation management sub-platform.

The smart gas indoor installation management sub-platform may obtain all the operation data of Internet of Things system 100 for the gas installation management through the smart gas data center and perform an analysis processing on all the operation data. In some embodiments, the smart gas indoor installation management sub-platform may include an installation requirement management module, an engineering plan management module, and a business tracking management module.

The smart gas indoor installation management sub-platform may review the user installation requirement information through the installation requirement management module to generate indoor installation review information (e.g., whether to accept the gas installation review information). The smart gas indoor installation management sub-platform may send the indoor installation review information to the smart gas data center. Further, the smart gas data center may feed the indoor installation review information back to the smart gas user platform through the smart gas service platform, forming a closed information loop between the smart gas user platform and the smart gas operation management platform regarding the installation requirement review management.

The smart gas indoor installation management sub-platform may manage an engineering assignment plan for an approved installation requirement (e.g., an accepted gas installation requirement) through the engineering plan management module to generate a door-to-door service plan. For example, the engineering plan management module may determine overall service intensity of the Internet of Things system 100 for smart gas installation management based on a user requirement and an operation and maintenance personnel availability degree. Further, the engineering plan management module may determine the door-to-door service plan based on the overall service intensity. The smart gas indoor installation management sub-platform may send the door-to-door service plan to the smart gas data center. Further, the smart gas data center may feed the door-to-door service plan back to the smart gas user platform through the smart gas service platform. The smart gas data center may further feed the door-to-door service plan back to the smart gas object platform through the smart gas sensor network platform for being executed by the subsequent smart gas indoor installation engineering object sub-platform.

The smart gas indoor installation management sub-platform may track, manage, and check an execution progress of the door-to-door service plan through the business tracking management module. For example, the operation and maintenance personnel may upload installation progress information to the business tracking management module through the smart gas indoor installation engineering object sub-platform, and upload system access information of a newly installed indoor device to the business tracking management module. After obtaining the above information, the business tracking management module may confirm completion of the installation and transmit the completion information to the smart gas user platform through the smart gas service platform for user confirmation.

The smart gas sensor network platform may be a functional platform for managing sensor communication. In some embodiments, the smart gas sensor network platform may be configured as a communication network and a gateway. In some embodiments, the smart gas sensor network platform may interact with the smart gas operation management platform and the smart gas object platform to realize information sensor communication. For example, the smart gas sensor network platform may receive user-confirmed completion information uploaded by the smart gas object platform, or issue a door-to-door service plan to the smart gas object platform. In some embodiments, the smart gas sensor network platform may include a smart gas indoor installation engineering sensor network sub-platform and a smart gas indoor device sensor network sub-platform.

The smart gas object platform may be configured as a plurality of types of devices related to gas installation. For example, the smart gas object platform may be configured as a gas device (including a pipeline network device, such as a pipeline, a gas meter, etc.) and a device related to implementation of installation engineering (including an installation engineering vehicle, a testing device, etc.). In some embodiments, the smart gas object platform may include a smart gas indoor installation engineering object sub-platform and a smart gas indoor device object sub-platform. The smart gas indoor installation engineering object sub-platform corresponding to the smart gas indoor installation engineering sensor network sub-platform may upload data related to execution of the installation engineering to the smart gas indoor installation engineering sensor network sub-platform. The smart gas indoor device object sub-platform corresponding to the smart gas indoor device sensor network sub-platform may upload the data related to the gas device to the smart gas indoor device sensor network sub-platform.

It should be noted that the aforementioned Internet of Things system 100 for smart gas installation management is provided for illustrative purposes only, and is not intended to limit the scope of the present disclosure. For those of ordinary skill in the art, various modifications or changes can be made based on the description of the present disclosure. For example, the IoT system 100 for smart gas installation management may include other suitable one or more components to implement similar or different functions. However, changes and modifications may not depart from the scope of the present disclosure.

Figure 2:
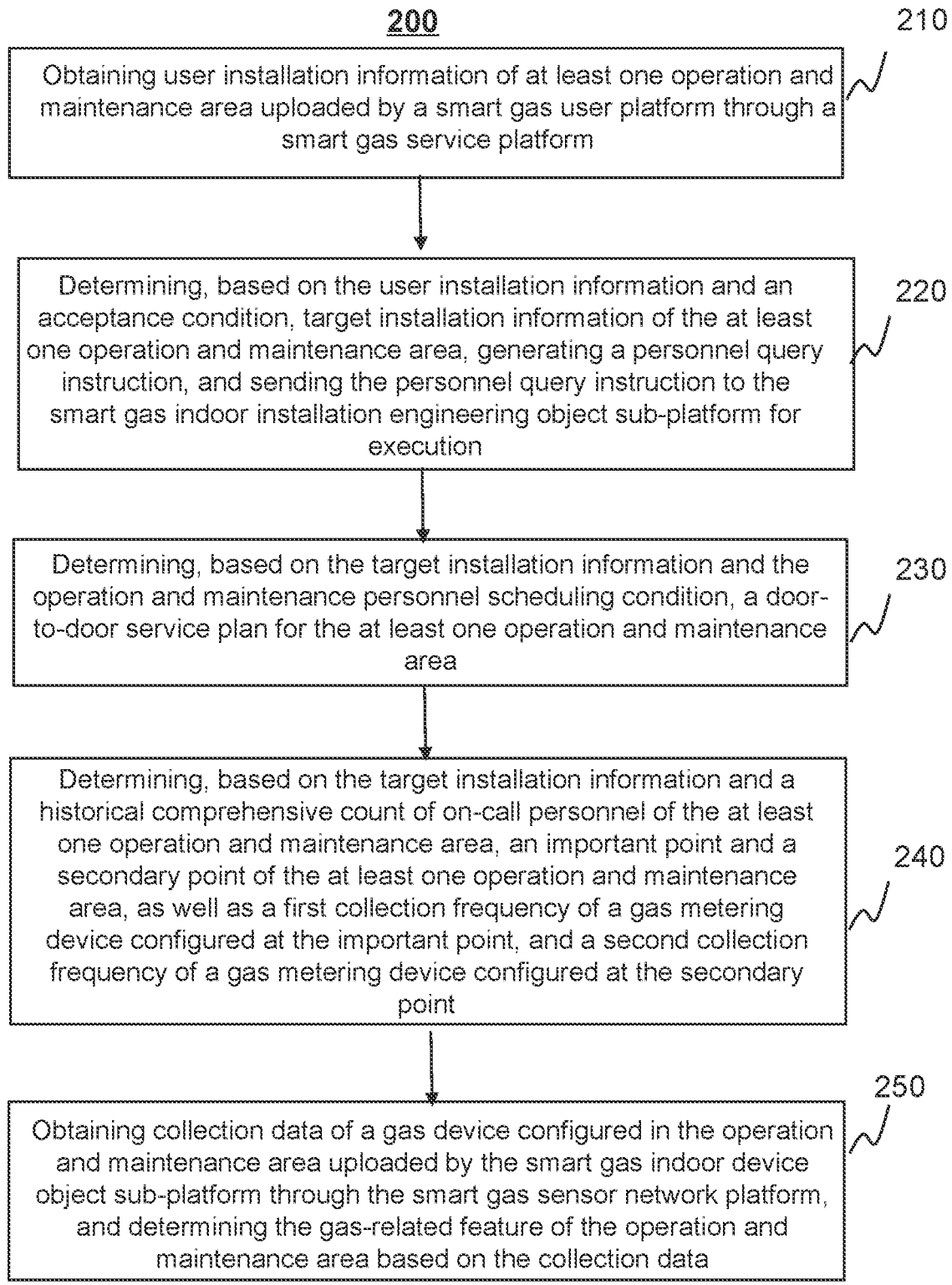
FIG. 2 is a flowchart illustrating an exemplary process for scheduling operation and maintenance personnel according to some embodiments of the present disclosure.

FIG. 2 is a flowchart illustrating an exemplary process for scheduling operation and maintenance personnel according to some embodiments of the present disclosure. In some embodiments, the process 200 may be performed by the Internet of Things system 100 for smart gas installation management.

In 210, obtaining user installation information of at least one operation and maintenance area uploaded by the smart gas user platform through the smart gas service platform.

The operation and maintenance area refers to an area where a gas company carries out operation and management. For example, the operation and maintenance area may be an administrative area, a street, an industrial park, etc.

The user installation information may refer to information required to be provided by a user to apply for gas installation, such as an installation address, an installation time, etc. In some embodiments, the user installation information may include time information, user information, property information, or any combination thereof.

The time information refers to information related to a time when a user submits a gas installation requirement. The time information may include the time when the user submits the gas installation requirement, a time when the user wants to carry out gas installation (i.e., an expected door-to-door time), etc.

The user information may refer to user identity information required to apply for gas installation. The user information may include a valid identification. For example, the valid identification may be obtained by the user uploading an identity card to a smart gas user platform or a third-party platform (e.g., an official account platform, a user service system, etc.). As another example, the valid identification may be obtained through face recognition by a camera of a terminal device taking a face image. The user information may further include a user type. For example, the user type may include one of industrial and commercial unit installation, developer centralization installation, and resident scatter installation. The user type may be obtained from information filled in the smart gas user platform by the user.

The property information may refer to house property information corresponding to an installation address of applying for gas installation. For example, the property information may include the property information (such as a property ownership certificate), physical address, etc., of the installation address. The property information may be obtained from the information uploaded by the user in the smart gas user platform.

In some embodiments, the user installation information may be filled by the user in the smart gas user platform or the third-party platform (e.g., the official account platform, the user service system, etc.) on his/her own.

In 220, determining, based on the user installation information and an acceptance condition, target installation information of the at least one operation and maintenance area, generating a personnel query instruction, and sending the personnel query instruction to the smart gas indoor installation engineering object sub-platform for execution.

The acceptance condition may refer to a necessary condition for the gas installation application. For example, the acceptance condition may include presence of a supporting municipal gas pipeline buried near the installation address. In some embodiments, different user types may further correspond to different acceptance conditions. For example, when the user type is the industrial and commercial unit installation, the acceptance condition may further include that the user has a business license; when the user type is the developer centralization installation, the acceptance condition may further include obtaining consent of a housing and construction management office and an owner. The acceptance condition may be preset by a manager (e.g., a person who manages the Internet of Things system for smart gas installation management).

The target installation information refers to user installation information of gas users who may perform gas installation services. For example, the target installation information may be user installation information that is accepted from user installation information uploaded by the smart gas user platform in the at least one operation and maintenance area. The target installation information may include accepted user installation information of at least one gas user.

After the user installation information and the acceptance condition is obtained, it may be reviewed by a system or manually to determine whether to accept the gas installation. The review may include verifying authenticity of the information filled in by the user, and verifying whether the acceptance condition is satisfied, etc. When the review of the user installation information is passed, it is determined to accept the gas installation, and the user installation information may be determined as the target installation information.

In some embodiments, for user installation information that does not meet an acceptance condition (that is, for users whose gas installation applications are not accepted), in response to non-acceptance of the gas installation, the smart gas operation management platform may send a reason for not accepting the gas installation to a user and prompt the user to re-upload the user installation information. For example, the smart gas operation management platform may send the reason for not accepting the gas installation to the smart gas user platform through an smart gas service platform. The smart gas user platform may display the reason for not accepting the gas installation to the user and prompt the user to re-upload the user installation information. An exemplary prompting mode may include, but is not limited to, voice prompting, text prompting, etc. For example, when clarity of the image taken during the user face recognition does not satisfy the requirement, the smart gas user platform may prompt the user by voice prompt to retake the face image in a place with a better lighting condition.

In some embodiments, the smart gas operation management platform may re-determine whether to accept gas installation based on the re-uploaded user installation information; and in response to accepting the gas installation, determine the re-uploaded user installation information as the target installation information. The personnel query instruction refers to a query instruction used to query relevant conditions of on-call operation and maintenance personnel. For example, the personnel query instruction may be used to query a count and an idle status of on-call operation and maintenance personnel in a certain operation and maintenance area. The on-call operation and maintenance personnel refers to personnel in the operation and maintenance area who is idle and may perform gas operation and maintenance related services. The gas operation and maintenance related service may include gas installation services, gas maintenance services, gas regular inspection services, etc. The same operation and maintenance personnel may provide multiple services at the same time, e.g., gas installation services, gas maintenance services, gas regular inspection services, etc.

In some embodiments, the personnel query instruction is used to obtain an operation and maintenance personnel scheduling condition of at least one operation and maintenance area.

The operation and maintenance personnel scheduling condition refers to a situation related to the work scheduling of the operation and maintenance personnel. For example, the operation and maintenance personnel scheduling condition may include one or more time periods during a day when the operation and maintenance personnel perform door-to-door operation and maintenance.

In some embodiments, the smart gas operation management platform may automatically generate the personnel query instruction based on an instruction template in response to determining the target installation information. The instruction template may be pre-inputted by the system or manually.

In some embodiments, the operation and maintenance personnel scheduling condition may include a total count of operation and maintenance personnel, an amount of installation tasks for each operation and maintenance personnel (e.g., a count of door-to-door services), and an execution time period of each installation task. The operation and maintenance personnel scheduling condition may be determined based on a work schedule of the operation and maintenance personnel.

In some embodiments, the operation and maintenance personnel scheduling condition may further include an operation and maintenance personnel availability degree. The operation and maintenance personnel availability degree may refer to a scheduling availability degree of the operation and maintenance personnel. The operation and maintenance personnel may refer to persons who perform the door-to-door service. The operation and maintenance personnel availability degree may be represented by a numerical value. The larger the value, the higher the operation and maintenance personnel availability degree. In some embodiments, the operation and maintenance personnel availability degree may include the availability degree values corresponding to a plurality of operation and maintenance personnel. For example, the operation and maintenance personnel availability degree may be ([A, 0.8], [B, 0.6], . . . ), indicating that operation and maintenance personnel A has an availability degree of 0.8, operation and maintenance personnel B has an availability degree of 0.6, etc. In some embodiments, the operation and maintenance personnel availability degree may further refer to an overall availability degree value of all operation and maintenance personnel. For example, the operation and maintenance personnel availability degree may be ([Monday, 0.2], [Tuesday, 0.4], . . . ), indicating that the operation and maintenance personnel availability degree is 0.2 on Monday, 0.4 on Tuesday, etc.

In some embodiments, the smart gas operation management platform may determine the operation and maintenance personnel availability degree based on the operation and maintenance personnel scheduling condition. For example, if operation and maintenance personnel A has been scheduled for 3 hours on Jan. 1, 2023, and daily working hours are 8 hours, the availability degree of the operation and maintenance personnel A on that day may be (8−3)÷8=0.625.

In 230, determining, based on the target installation information and the operation and maintenance personnel scheduling condition, a door-to-door service plan for the at least one operation and maintenance area.

The door-to-door service plan refers to a plan in which operation and maintenance personnel come to perform gas installation services. In some embodiments, the door-to-door service plan includes a door-to-door time and door-to-door personnel corresponding to the target installation information (including a count of operation and maintenance personnel for door-to-door service, etc.), a door-to-door service content (e.g., on-site survey, gas consumption plan design, pipeline natural gas installation, etc.) etc.

In some embodiments, a piece of target installation information may correspond to at least one door-to-door service plan. For example, the target installation information submitted by resident A may correspond to a door-to-door service plan 1 and a door-to-door service plan 2. The door-to-door service plan 1 may be that operation and maintenance personnel A conducts the door-to door site survey and gas solution design at 14:00 on Jan. 1, 2022, and the door-to-door service plan 2 may be that operation and maintenance personnel B conducts door-to-door installation of pipeline natural gas at 9:00 on Jan. 10, 2022.

The door-to-door service plan may be determined in a variety of ways. In some embodiments, the smart gas operation management platform may determine the door-to-door time based on an expected door-to-door time in the target installation information updated by a gas user; determine on-call operation and maintenance personnel who are idle during the door-to-door time based on the operation and maintenance personnel scheduling condition as the door-to-door personnel; and determine the door-to-door service content based on historical operation and maintenance records of the gas user corresponding to the target installation information. For example, when historical operation and maintenance records show that the user has no on-site survey records, the smart gas operation management platform may determine that the door-to-door service content is on-site survey. As another example, if the historical operation and maintenance records show that there is an on-site survey record, but there is no record of the gas consumption plan design, the smart gas operation management platform may determine that the door-to-door service content is the gas consumption plan design, etc.

In some embodiments, for each piece of target installation information, the smart gas operation management platform may determine a door-to-door priority corresponding to the target installation information based on the target installation information and a gas-related feature of the operation and maintenance area to which the target installation information belongs; assign a door-to-door time corresponding to each piece of target installation information in accordance with the door-to-door priorities of a plurality of pieces of target installation information; and determine an on-call operation and maintenance personnel who is idle during the door-to-door time based on the operation and maintenance personnel scheduling condition as the door-to-door personnel.

In some embodiments, the smart gas operation management platform may determine, based on time information and user information in the target installation information, and the gas-related feature of the operation and maintenance area to which the target submission information belongs, the door-to-door priority corresponding to the target submission information using a preset algorithm. In a specific embodiment, the smart gas operation management platform may perform normalization processing on a submission time of an installation requirement, the user information, and the gas-related feature; weighting based on the normalized submission time of the installation requirement, normalized user information, and normalized gas-related feature to determine the door-to-door priority of the target installation information. The normalization processing may normalize the submission time of the installation requirement, the user information, and the gas-related feature to a preset range of values (e.g., [0,1]). The embodiments of the present disclosure do not have a special limitation on the normalization processing, and it is sufficient to adopt operations known to those skilled in the art. For example, exemplary normalization processing manners include but are not limited to, linear normalization, Z-Score normalization, decimal calibration normalization, or the like.

In some embodiments, the weights corresponding to the submission time of the installation requirement, the user information, and the gas-related feature, respectively, may be preset by the system or by a human. For example, the earlier the submission time of the installation requirement, the higher the corresponding weight. For example, the weight corresponding to the user information may be preset according to the type of user, such as setting the weights for commercial and industrial households and developers to higher values, and setting the weights for residents to lower values. As another example, the weight corresponding to the gas-related feature may be determined based on the gas consumption in the gas-related feature, and the higher the gas consumption, the higher its corresponding weight. For more description of the gas-related feature, refer to operation 250 and its related description.

In some embodiments, the smart gas operation management platform may determine a user requirement based on the target installation information; and determine the door-to-door service plan based on the user requirement and the operation and maintenance personnel scheduling condition.

The user requirement may refer to a related requirement that the user expects to receive a door-to-door service, for example, the user requirement may include a date, a time, and content (e.g., site survey, gas solution design, installation of pipeline natural gas, etc.) of the door-to-door service that the user expects to receive.

In some embodiments, the smart gas operation management platform may determine the user requirement based on time information in the target installation information. In some embodiments, the smart gas operation management platform may obtain the user requirement via the smart gas user platform. The user requirement may be filled in by the user in the smart gas user platform on his/her own.

In some embodiments, the smart gas operation management platform may sort the operation and maintenance personnel according to the operation and maintenance personnel scheduling condition according to an amount of tasks from high to low; sort the target installation information based on the user requirement according to the submission time of the installation requirement from early to late; and match according to a sorting result of the operation and maintenance personnel and a sorting result of the target installation information to determine the door-to-door personnel corresponding to the target installation information.

The way of matching the operation and maintenance personnel with the target installation information includes various ways. For example, the smart gas operation management platform may match the top-ranked operation and maintenance personnel with the top-ranked target installation information one by one, update the ordering of the operation and maintenance personnel in real-time according to changes in the amount of installation tasks, and match the target installation information according to updated ordering of the operation and maintenance personnel. For example, the smart gas operation management platform may first match one or more pieces of target installation information for the operation and maintenance personnel with the most advanced sorting until an amount of installation tasks of the operation and maintenance personnel reaches a preset task amount threshold, and then continue to match the target installation information for the operation and maintenance personnel with the next sorting until all of the target installation information has been matched. It is to be noted that matching the operation and maintenance personnel with the target installation information indicates assigning to the operation and maintenance personnel an installation task corresponding to the target installation information.

In some embodiments, the smart gas operation management platform may determine an overall service intensity of the IoT system based on the user requirement and the operation and maintenance personnel scheduling condition; adjust the count of operation and maintenance personnel and update the operation and maintenance personnel scheduling condition based on the overall service intensity; and determine the door-to-door service plan based on the user requirement and the updated operation and maintenance personnel scheduling condition.

The overall service intensity may refer to work intensity of the Internet of Things system for smart gas installation providing the door-to-door service. The overall service intensity may reflect a degree of balance between supply and demand of the Internet of Things system for smart gas installation management providing the door-to-door service. The overall service intensity may be indicated by a value greater than or equal to zero. When the overall service intensity is smaller than one, it may mean that a count of requirements per unit time is smaller than the count of services per unit time, i.e., a count of users waiting in line may decrease over time, and the Internet of Things system for smart gas installation management may operate efficiently. When the overall service intensity is equal to 1, it may mean that the count of requirements per unit time is equal to the count of services per unit time, i.e., the count of users waiting in line may remain basically unchanged over time, and the supply and demand of the Internet of Things system for smart gas installation management may be balanced. When the overall service intensity is greater than 1, it may mean that the count of user requirements per unit time is greater than the count of door-to-door services per unit time, i.e., the count of users waiting in line may increase over time, and load of the Internet of Things system for smart gas installation management may be too high to satisfy the user requirement in time.

The count of requirements per unit time may refer to a count of user installation requirements accepted in a unit time, for example, 100 households/day. The count of services per unit time may refer to a count of door-to-door services performed by operation and maintenance personnel in a unit time, e.g., 120 households/day. Further description regarding the count of requirements per unit time and the count of services per unit time may be found in FIG. 3 and related description thereof.

In some embodiments, the smart gas operation management platform may determine, based on the user requirement and the operation and maintenance personnel scheduling condition, a count of requirements per unit time for gas installation and a count of services per unit time; and determine the overall service intensity based on the count of requirements per unit time and the count of services per unit time. For example, the count of user requirements and the count of door-to-door services on the day may be counted, and a ratio of the above two types of data may be configured as the overall service intensity of the Internet of Things system for smart gas installation management.

In some embodiments, the smart gas operation management platform may determine, based on the user requirement and the operation and maintenance personnel scheduling condition, distribution of the count of requirements per unit time for gas installation and distribution of the count of services per unit time; and determine the overall service intensity based on the distribution of the count of requirements per unit time and the distribution of the count of services per unit time. For more information on determining the overall service intensity, refer to FIG. 3 and its related description.

In some embodiments, the smart gas operation management platform may determine the door-to-door service plan based on a degree of the overall service intensity. For example, when the overall service intensity is too strong on Monday, a door-to-door time of the door-to-door service plan may be determined to be Tuesday, etc.

In some embodiments, the smart gas operation management platform may adjust a count of operation and maintenance personnel and update the operation and maintenance personnel availability degree based on the overall service intensity.

In some embodiments, the smart gas operation management platform may adjust the count of operation and maintenance personnel and update the operation and maintenance personnel availability degree based on the overall service intensity and an intensity threshold. When the overall service intensity is greater than the intensity threshold, the smart gas operation management platform may increase the total count of operation and maintenance personnel until the overall service intensity is smaller than or equal to the intensity threshold to reduce the load of the Internet of Things system for smart gas installation management. At the same time, the availability degree of the new operation and maintenance personnel may be set to 1 and the availability degree of the original operation and maintenance personnel may be kept unchanged to update the operation and maintenance personnel availability degree. The intensity threshold may be a system default value, an empirical value, a manually pre-set value, or the like, or any combination thereof, which may be set according to an actual requirement, and is not limited in the present disclosure. For example, the intensity threshold may be set to 1. When the overall service intensity is consistently greater than 1, the Internet of Things system for smart gas installation management may not achieve the balance between supply and demand.

In some embodiments, the smart gas operation management platform may further determine an average waiting queue length based on the overall service intensity and the total count of operation and maintenance personnel through a preset algorithm; and adjust the count of operation and maintenance personnel based on the overall service intensity and the average waiting queue length. Further description regarding the adjusting the count of operation and maintenance personnel may be found in FIG. 4 and related description thereof.

In some embodiments, the smart gas operation management platform may determine the door-to-door service plan based on the user requirement and the updated operation and maintenance personnel availability degree. For example, the smart gas operation management platform may determine a waiting queue based on the user requirement (e.g., queueing users based on the expected time of the door-to-door service in the user requirement to determine the waiting queue), thereby assigning a first user in the waiting queue to operation and maintenance personnel with a greatest updated operation and maintenance personnel availability degree to determine the door-to-door service plan. Exemplarily, if user A is a first place in the waiting queue, the expected date and time of the door-to-door service is 10:00 on Oct. 30, 2022, and the expected content of the door-to-door service is the site survey and the gas solution design, and the operation and maintenance personnel with the greatest updated availability degree is operation and maintenance personnel B, then the door-to-door service plan that operation and maintenance personnel B will conduct the door-to-door site survey and gas solution design at 10:00 on Oct. 30, 2022 may be determined.

In some embodiments of the present disclosure, when the overall service intensity is too large, increasing the count of operation and maintenance personnel and updating the operation and maintenance personnel availability degree can ensure that the Internet of Things system for smart gas installation management can continuously address the user requirement without making the user queue indefinitely.

In some embodiments, the smart gas operation management platform may also determine an average waiting time based on the overall service intensity; queue users based on the user-expected door-to-door times and the average waiting time; and then determine the door-to-door service plan based on a queuing result. More on determining the door-to-door service plan based on the queuing result can be found in FIG. 5 and its related description.

In some embodiments, the smart gas operation management platform may arrange the door-to-door service plans corresponding to the plurality of pieces of target installation information of the at least one operation and maintenance area in order of the door-to-door times to construct a door-to-door service plan table. The door-to-door service plans having the same door-to-door time may be arranged randomly.

In 240, determining, based on the target installation information and a historical comprehensive count of on-call personnel of the at least one operation and maintenance area, an important point and a secondary point of the at least one operation and maintenance area, as well as a first collection frequency of a gas metering device configured at the important point, and a second collection frequency of a gas metering device configured at the secondary point.

The historical comprehensive count of on-call personnel is an average count of on-call operation and maintenance personnel at the time the historical gas installation was performed.

In some embodiments, the important point is related to a target installation address corresponding to the target installation information, and the secondary point is related to other installation locations within the operation and maintenance area.

In some embodiments, the smart gas operation management platform may determine the important point and the secondary point based on the target installation information. In some embodiments, the smart gas operation management platform may determine gas consumption detection locations within a certain range near the installation address corresponding to the user installation information for which the gas installation is accepted (i.e., the target installation information) as important points, and gas consumption detection locations within a certain range near the installation address corresponding to the user installation information for which the gas installation is not accepted as secondary points.

In some embodiments, the smart gas operation management platform may determine a first collection frequency of a gas metering device configured at the important point, and a second comprehensive count of on-call personnel frequency of a gas metering device configured at the secondary point, based on the historical comprehensive count of on-call personnel of the at least one operation and maintenance area and a preset mapping relationship. In some embodiments, the preset mapping relationship may include a correspondence between the historical comprehensive count of on-call personnel and the second collection frequency of the gas metering device configured at the secondary point. For example, the correspondence between the historical comprehensive count of on-call personnel and the second collection frequency of the gas metering device configured at the secondary point may be positively correlated, with the larger the historical comprehensive count of on-call personnel, the higher the second collection frequency. In some embodiments, the first collection frequency is greater than the second collection frequency. The smart gas operation management platform may determine the first collection frequency based on an adjustment ratio after determining the second collection frequency. For example, the adjustment ratio may be a factor greater than 1. The adjustment ratio may be preset by the system or by a human.

It is to be noted that a higher historical comprehensive count of on-call personnel indicates a higher scheduling capability value of the operation and maintenance area, representing that the gas company invests more human resources in the operation and maintenance area, and attaches higher importance to the area. In some embodiments of the present disclosure, by determining that the correspondence between the historical comprehensive count of on-call personnel and the second collection frequency is positively correlated, it is possible to increase the second collection frequency when the historical comprehensive count of on-call personnel is higher to strengthen supervision and to collect more gas consumption of gas users so as to better analyze the user requirement, thereby making adjustments in time in order to improve the satisfaction of the users. For more description of the scheduling capacity value, please refer to operation 270 and its related description.

In 250, obtaining collection data of a gas device configured in the operation and maintenance area uploaded by the smart gas indoor device object sub-platform through the smart gas sensor network platform, and determining the gas-related feature of the operation and maintenance area based on the collection data.

The collection data of the gas device may include a variety of types. When the gas device includes a gas meter, the collection data includes gas consumption. When the gas device includes a pressure metering device, the collection data includes gas pressure data. When the gas device includes a flow rate metering device, the collection data includes gas flow rate data. Embodiments of the present disclosure do not limit the types of gas device.

In some embodiments, the collection data may include at least one of an average value of gas consumption at the important point over a time period, an average value of gas consumption at the secondary point over a time period, and an average value of gas consumption at the operation and maintenance area over a time period. For example, the average value of gas consumption may be a statistical value such as an average weekly gas consumption, an average monthly gas consumption, etc.

In some embodiments, the collection data may include a first gas consumption sequence of the important point over a time period, a gas consumption sequence of the secondary point over a time period. The first gas consumption sequence is a sequence consisting of a plurality of gas consumption values obtained by a gas meter configured at the important point with a first collection frequency over a time period. The second gas consumption sequence is a sequence of a plurality of gas consumption values obtained by a gas meter configured at the secondary point with a second collection frequency over a time period.

In some embodiments, the collection data may further include at least one of an average value of gas pressure at the important point over a time period, an average value of gas pressure at the secondary point over a time period, and an average value of gas pressure at the operation and maintenance area over a time period. In some embodiments, the collection data may include a first gas pressure sequence of the important point over a time period and a second gas pressure sequence of the secondary point over a time period. The first gas pressure sequence is a sequence consisting of a plurality of gas pressure values obtained by a pressure metering device configured at the important point with a first collection frequency over a time period. The second gas pressure sequence is a sequence consisting of a plurality of gas pressure values obtained by a pressure metering device configured at the secondary point with a second collection frequency over a time period.

The gas-related feature is a feature related to gas delivery within the operation and maintenance area. For example, the gas-related feature may be a gas consumption amount, an actual gas delivery amount, a transmission and distribution pipeline arrangement, etc.

In some embodiments, the gas-related feature may include a gas consumption feature. The gas consumption feature is a feature that reflects a user's gas consumption in an operation and maintenance area. In some embodiments, the gas consumption feature may include a normal supply of gas for a certain time period, e.g., the amount of gas consumption of the user, or the like. The gas consumption amount may be averaged. The gas consumption amount may reflect a level of risk of gas leakage. For example, the higher the gas consumption amount, the higher the severity of potential injuries and deaths in the event of a gas leakage. In some embodiments, the gas consumption feature may include a total count of gas consumption failures in the operation and maintenance area. The count of gas consumption failures may reflect the safety of the gas facilities in the area where the user is located. For example, the higher the count of gas consumption failures that occur, the higher the risk of gas leakage in the area. In this context, the gas consumption failure is a situation in which the user is unable to use gas normally due to an abnormal gas supply. For example, the gas consumption failure may be a gas line leakage, a gas meter malfunction, a gas outage, or the like.

In some embodiments, the smart gas operation management platform may determine, based on the collection data, whether there is a gas consumption failure. For example, when there is an abnormality in the collection data, there may be a gas consumption failure.

In some embodiments, the gas-related features may also include gas facility features.

The gas facility features may refer to the features that can reflect the situation of the hardware facilities for gas transmission. For example, a gas facility feature may be a cooktop, a connection tightness of a valve, or the like.

In some embodiments, the gas facility features may include a type of a gas meter and a wear degree of a wiring.

Usually, a gas meter needs to be configured to calculate the gas consumption. Different gas meters have different maximum rated flow rates. For example, general residential users may set up a 1.6-type gas meter according to their demands, and maximum rated flow of the gas meter is 2.5 $m^3/h$. Users with additional heating device and large living area (a villa area) may choose high-type gas meters, such as 2.5-type, 4-type, 6-type, etc. In some embodiments, the gas-related features may be determined based on the type of gas meter. For example, if the household gas meters in area A are all 4-type gas meters, the corresponding gas-related feature in this area is that the demand for gas is large.

In some embodiments, the type of gas meter may reflect the severity of the gas leakage hazard. For example, older models of gas meters are more prone to failure than newer models, so gas leakages are less noticeable to users.

In some embodiments, the wear degree of the wiring is related to the use years of wiring. The longer the use years, the higher the wear degree of the wiring and the higher the risk of gas leakage.

In some embodiments, the wear degree of the wiring is related to a pressure during the gas delivery. The higher the pressure during gas delivery, the more serious the wiring wear may be. The pressure data during gas delivery may be read from the metering device of the gas wiring. In some embodiments, a table corresponding to the wear degree of the wiring and the pressure during the gas delivery may be manually set. For example, the wear degree of the wiring corresponding to the high-pressure delivery when the pressure during the gas delivery exceeds the threshold value may be to the third-level wear, and the wear degree of the wiring corresponding to the low-pressure delivery when the pressure during the gas delivery is lower than the threshold value may be set to the first-level wear, then the wear degree of the wiring may be determined based on the correspondence in the correspondence table.

In 260, determining a count of on-call personnel of the at least one operation and maintenance area based on the gas-related feature of the at least one operation and maintenance area, the target installation information, and the door-to-door service plan.

The count of on-call personnel refers to a count of on-call operation and maintenance personnel. For more information about the on-call operation and maintenance personnel, please refer to operation 220 and its related descriptions.

In some embodiments, for each operation and maintenance area, the smart gas operation management platform may construct a vector to be matched based on the gas-related feature, the target installation information, and the door-to-door service plan of the operation and maintenance area; based on the vector to be matched, perform vector matching in a vector database and determine a reference vector that meets a preset matching condition as an associated vector; and based on the associated vector, determine the count of on-call personnel of the operation and maintenance area. The preset matching condition refers to a preset condition used to determine the associated vector. In some embodiments, the preset matching condition may include vector distance satisfying a distance threshold, the vector distance being minimum, etc.

The vector to be matched may be a feature vector constructed based on the gas-related feature, the target installation information, and the door-to-door service plan. In some embodiments, feature extraction may be performed on the gas-related feature, the target installation information, and the door-to-door service plan to obtain the vector to be matched.

The vector database may include a plurality of reference vectors and corresponding reference counts of on-call personnel. The reference vector and the reference count of on-call personnel corresponding to the reference vector may be constructed based on historical operation and maintenance data. In some embodiments, the smart gas operation management platform may filter a target historical operation and maintenance data that meets a preset filtering condition from the historical operation and maintenance data; constructs a reference vector based on a gas-related feature, target installation information, and a door-to-door service plan in the target historical operation and maintenance data; and determine a count of historical on-call personnel in the target historical operation and maintenance data as the count of on-call personnel corresponding to the reference vector. In some embodiments, the preset filtering condition may include: there is no situation where all historical on-call operation and maintenance personnel are performing installation services and there is still insufficient manpower; at the same time, an average idle time of the historical on-call operation and maintenance personnel is not greater than a preset time threshold. The preset time threshold may be a system or human preset value, etc.

In some embodiments, the smart gas operation management platform may determine the reference count of on-call personnel corresponding to the associated vector as the count of on-call personnel corresponding to the vector to be matched.

In some embodiments, the smart gas operation management platform may determine, based on the gas-related feature of the at least one operation and maintenance area, an alert vector of the at least one operation and maintenance area; and determine the count of on-call personnel of the at least one operation and maintenance area based on the alert vector of the at least one operation and maintenance area, the target installation information, and the door-to-door service plan.

The alert vector may reflect the probability that the user needs gas maintenance. For example, the alert vector may be a plurality of alert values that reflect the degree of maintenance warning, and the higher the alert value, the higher the probability that gas maintenance is required.

In some embodiments, the alert vector may include a leakage alert value. The leakage alert value may be configured to reflect the probability of gas leakage, and the higher the leakage alert value, the higher the possibility of gas leakage.

In some embodiments, the alert vector may also include an overhaul alert value, a maintenance alert value, or the like. The overhaul alert value may be configured to reflect the probability that the wiring needs to be checked for safety, and the maintenance alert value may be configured to reflect the probability that the wiring needs to be repaired.

In some embodiments, the smart gas operation management platform may perform feature extraction on the gas-related feature to obtain a corresponding alert vector. The manner for performing the feature extraction may include, but is not limited to, a multilayer perceptron, a convolutional neural network, a residual network, or the like.

In some embodiments, the smart gas operation management platform may determine an allocation of the on-call operation and maintenance personnel to each operation and maintenance area based on the total count of on-call operation and maintenance personnel and a proportion of operation and maintenance areas with leakage alert values to all areas. For example, the leakage alert values of areas A, B, C, and D are 0.9, 0.3, 0.2, and 0.2, respectively, and the total counts of on-call operation and maintenance personnel is 32, and if the count of on-call operation and maintenance personnel left in areas A, B, C and D is the same and their distance to the on-call operation and maintenance personnel's area to be scheduled is the same, the on-call operation and maintenance personnel that may be allocated to area A is 32 (persons)×0.9/(0.9+0.3+0.2+0.2)=18 (persons), the on-call operation and maintenance personnel allocated to area B is 32 (persons)×0.3/(0.9+0.3+0.2+0.2)=6 (persons), and the on-call operation and maintenance personnel allocated to areas C and D are 32 (persons)×0.3/(0.9+0.3+0.2+0.2)=6 (persons), and the on-call operation and maintenance personnel allocated to areas C and D are 32 (people)×0.2/(0.9+0.3+0.2+0.2)=4 (people), respectively.

In some embodiments, the smart gas operation management platform may determine an operation and maintenance demand value for the at least one operation and maintenance region based on the alert vector of the at least one operation and maintenance area, the target installation information, and the door-to-door service plan; and based on the operation and maintenance demand value, determine the count of on-call personnel.

The operation and maintenance demand value is a current and future demand degree for operation and maintenance personnel in the operation and maintenance area. The higher the operation and maintenance demand value, the higher the demand degree for the operation and maintenance personnel.

In some embodiments, the smart gas operation management platform may determine the operation and maintenance demand value by weighted summation based on an alert vector coefficient corresponding to the alert vector of the operation and maintenance area, an installation coefficient corresponding to the target installation information of the operation and maintenance area, and a difference coefficient corresponding to a difference between a count of door-to-door service plans and a count of pieces of target reporting information. The weights may be system preset values or human preset values, etc.

In some embodiments, the smart gas operation management platform may determine a ratio of an alert vector of an operation and maintenance area to a sum of alert vectors of all the operation and maintenance areas as the alert vector coefficient of the operation and maintenance area.

In some embodiments, the smart gas operation management platform may determine the installation coefficient corresponding to the target installation information based on a submission time of installation requirement and user information in the target installation information. For example, the smart gas operation management platform may normalize the submission time of installation requirement; determine a type coefficient based on the user information; and determine the installation coefficient based on the type coefficient and the normalized submission time of installation requirement. The type coefficients corresponding to different user types may be preset based on historical data or prior knowledge. Merely by way of example, the following formula (1) can be used to determine the installation coefficient.

$$r = j \times e^{\frac{(t-t_{a1})}{\sum_1^b (t-t_{g1})}} \quad (1)$$

where r is the installation coefficient, j is the type coefficient, t is the current time, $t_{a1}$ is a submission time of installation requirement of a-th target installation information, b is the total count of pieces of target installation information, $t_{g1}$ is a submission time of installation requirement of i-th target installation information, and $$e^{\frac{(t-t_{a1})}{\sum_1^b (t-t_{g1})}}$$

is a normalization result of the submission time of installation requirement.

In some embodiments, the smart gas operation management platform may determine the difference coefficient by querying a preset comparison table based on the difference between the count of door-to-door service plans and the count of target installation information. The preset comparison table may include correspondences between different difference values and different difference coefficients. The preset comparison table may be predetermined based on historical data or prior knowledge.

In some embodiments of the present disclosure, more reasonable alert vectors may be determined based on the distribution of gas users in different areas, thereby ensuring the reasonableness of the count of on-call operation and maintenance personnel of the different areas to be determined subsequently, and avoiding the setting of too many or not enough personnel, which affects the efficiency of gas operation and maintenance.

In some embodiments, the alert vector may also include a gas cut-off alert value, and the gas-related features may also include a gas facility feature. In some embodiments, the smart gas operation management platform may determine a gas cut-off alert value of the at least one area based on the gas facility feature of the at least one operation and maintenance area. The gas facility feature includes a type of a gas meter and a wear degree of a wiring. For more description of the gas facility feature, refer to operation 250 and its related description. For example, the older the gas meter and the more wear and tear on the wiring, the higher the gas cut-off alert value. In some embodiments, if the wiring reflected by the alert vector corresponding to the gas facility feature is relatively old, the gas cut-off alert value may be determined to be 0.8; if the user's gas meter is relatively new, the gas-cut alert value may be determined to be 0.1.

The gas cut-off alert value may be configured to reflect the probability of gas cut-off, and the higher the gas cut-off alert value, the higher the possibility of gas cut-off.

In some embodiments, the gas cut-off alert value is related to the count of gas consumption failures. When the count of gas consumption failures is higher, the smart gas operation management platform may set the gas cut-off alert value to a higher value. For example, when the count of gas consumption failures per month is between 0-10 times, the gas cut-off alert value may be set to 0.1, when the count of gas consumption failures per month is between 10-30 times, the gas cut-off alert value may be set to 0.3, and when the count of gas consumption failures per month is between 30-60 times, the gas cut-off alert value may be set to 0.6.

In some embodiments, the smart gas operation management platform may determine an allocation of the on-call operation and maintenance personnel to each operation and maintenance area based on the total count of on-call operation and maintenance personnel and a proportion of operation and maintenance areas with leakage alert values to all areas. For further instructions, refer to the preceding related descriptions.

In some embodiments of the present disclosure, determining the count of on-call operation and maintenance personnel in different operation and maintenance areas based on the gas leakage alert values of the different operation and maintenance areas can make the allocation of the operation and maintenance personnel more reasonable.

In 270, in response to a determination that there is at least one operation and maintenance area satisfying a preset scheduling condition, determining the scheduling capability value of the at least one operation and maintenance area.

The preset scheduling condition is a preset condition for determining whether scheduling of operation and maintenance personnel is required. In some embodiments, the preset scheduling condition may be that the count of on-call personnel in the operation and maintenance area is less than a preset count threshold of personnel. The preset count threshold of personnel may be a system or human preset value, e.g., 0, 1, 2, etc.

In some embodiments, when the count of on-call personnel in the operation and maintenance area is less than the preset count threshold of personnel, it can be determined that the operation and maintenance area satisfies the preset scheduling condition, and the operation and maintenance area is the area to be scheduled.

In some embodiments, the scheduling capability value may reflect an ability to dispatch operation and maintenance personnel to other areas.

In some embodiments, the smart gas operation management platform may determine the scheduling capability value for the operation and maintenance area based on a supply-demand ratio of operation and maintenance personnel of the operation and maintenance area. For example, the greater the supply-demand ratio of the operation and maintenance personnel of the operation and maintenance area, the greater the ability to dispatch the operation and maintenance personnel to the area with insufficient operation and maintenance personnel, i.e., the greater the scheduling capability value. The area to be scheduled has a scheduling capability value of 0.

In some embodiments, the smart gas operation management platform may determine the scheduling capability value of the operation and maintenance area based on an actual count of on-call operation and maintenance personnel in the operation and maintenance area. For example, the higher the count of personnel, the higher the scheduling capability value. The actual count of on-call operation and maintenance personnel in each operation and maintenance area may be prearranged. A correspondence between the actual count of on-call operation and maintenance personnel and the scheduling capability value may be determined based on historical data or prior knowledge.

In some embodiments, the smart gas operation management platform may determine a supply-demand ratio of the operation and maintenance personnel for the operation and maintenance area based on the count of operation and maintenance personnel assigned to the operation and maintenance area versus an average installation volume for the operation and maintenance area. The supply-demand ratio of the operation and maintenance personnel may also be determined in other ways, which are not limited herein.

In some embodiments, the smart gas operation management platform may obtain the scheduling capacity value of the operation and maintenance area corresponding to each node by constructing an area map and performing a plurality of round of iteratively update on an initial scheduling capacity value of the each node in the area map. For more description on determining the scheduling capability value, refer to FIG. 6 and its related descriptions.

In 280, based on the scheduling capability value of the at least one operation and maintenance area, determining a real-time scheduling instruction and issuing the real-time scheduling instruction to the smart gas indoor installation engineering object sub-platform for execution.

The real-time scheduling instruction is a control instruction for performing personnel scheduling.

In some embodiments, the real-time scheduling instruction includes scheduling arrangements for on-call operation and maintenance personnel for different operation and maintenance areas. The scheduling arrangement is an arrangement for scheduling the on-call operation and maintenance personnel for different operation and maintenance areas. In some embodiments, the scheduling arrangement may include a scheduling time, a scheduling quantity, and a scheduling location for scheduling the on-call operation and maintenance personnel for different operation and maintenance areas. For example, the scheduling arrangement may be scheduling 2 on-call operation and maintenance personnel from area A to area B within time period 1, etc.

In some embodiments, the smart gas operation management platform may determine the scheduling arrangement based on scheduling capacity values of neighboring areas of the area to be scheduled in various ways to further generate the real-time scheduling instruction. For example, the smart gas operation management platform may sort the scheduling capability values of the neighboring areas from high to low, and dispatch a corresponding count of on-call operation and maintenance personnel from the neighboring areas to the area to be scheduled according to the order from high to low, until the count of on-call operation and maintenance personnel in the area to be scheduled meets a preset count. The count of on-call operation and maintenance personnel in the area to be scheduled may be set according to the actual demand, and is not restricted herein. It is to be noted that different scheduling capability values correspond to different counts of dispatchable personnel, for example, the higher the scheduling capability value of the operation and maintenance area, the higher the count of dispatchable on-call operation and maintenance personnel. The correspondence between the scheduling capability value and the count of dispatchable personnel may be determined based on historical data or prior knowledge.

In 290, in response to compensation time off information uploaded by the smart gas indoor installation engineering object sub-platform, updating the scheduling capability value of the at least one operation and maintenance area, and adjusting the real-time scheduling instruction.

The compensation time off information is information related to a compensation situation of the operation and maintenance personnel. For example, the compensation time off information may include time off from work or the like. The compensation time off information may be uploaded by the operation and maintenance personnel to the smart gas indoor installation engineering object sub-platform, and then uploaded by the smart gas indoor installation engineering object sub-platform to the smart gas operation management platform via the smart gas indoor installation engineering sensor network sub-platform.

In some embodiments, the smart gas operation management platform may update the operation and maintenance personnel scheduling condition based on the compensation time off information; and update the scheduling capacity value of the at least one operation and maintenance area based on the updated operation and maintenance personnel scheduling condition.

In some embodiments, the smart gas operation management platform may perform a plurality of rounds of iterative update on the scheduling capacity value, and the update ends when the scheduling capacity value satisfies a preset condition.

The iterative update may refer to the process of updating the scheduling capability value of each area in the current round based on the scheduling capability value of each area in the previous round, thereby obtaining the final scheduling capability value of each area. For example, the smart gas operation management platform may perform a plurality of rounds of deduction and calculation through modeling or various analysis methods based on information such as gas-related features of each area and the count of on-call operation and maintenance personnel to update the scheduling capability value of each area.

The preset condition may be a condition for ending the iterative update that is preset based on various rules. For example, the preset condition may be that the count of iterations reaches a preset threshold of the count of iterations (e.g., 100 times). For another example, the preset condition may be that the absolute value of the difference between the sums of the scheduling capability values of all areas in two adjacent rounds of iterations is smaller than a preset difference threshold. Exemplarily, after the 40th round of iterative update, the sum of the scheduling capability values of all area is 51.5, and after the 41st round of iterative update, the sum of the scheduling capability values of all areas is 51.6, and the absolute value of the difference between the two is |51.6−51.5|=0.1. If the preset difference threshold is 0.2, the update ends.

In some embodiments, the smart gas operation management platform may perform a plurality of rounds of iterative updates on the scheduling capability value of each area based on a third preset algorithm. More Descriptions may be found in FIG. 6 and its related descriptions.

In some embodiments, the smart gas operation management platform may adjust the real-time scheduling instruction based on the updated scheduling capability value. For example, the smart gas operation management platform may determine the updated scheduling arrangement based on the updated scheduling capability value to adjust the previous real-time scheduling instruction.

In some embodiments, the smart gas operation management platform may determine the scheduling arrangement according to a preset rule based on the updated scheduling capability value of each area.

For example, the smart gas operation management platform may determine the count of personnel to be scheduled based on the proportional relationship of the scheduling capability values of the areas. Exemplarily, for areas A, B, C, D, and E, the count of on-call operation and maintenance personnel in area C may be 0, and 10 gas operation and maintenance personnel may be required. If the scheduling capability values of areas A, B, D, and E are 1, 2, 1, and 1, respectively, the proportional relationship of the corresponding scheduling personnel is 1:2:1:1, the count of operation and maintenance personnel allocated from area B to area C is $10*1/5=2$, and the count of operation and maintenance personnel allocated from area B to area C is $10*2/5=4$ based on the proportional relationship. By analogy, the count of operation and maintenance personnel allocated from areas D and E is 2 and 2 respectively.

For example, for areas that need operation and maintenance personnel, the smart gas operation management platform may sort the areas based on their scheduling capability values from largest to smallest, and first draw operation and maintenance personnel from the area with the largest scheduling capability value, and when the count of personnel in the target area does not meet the demand, then draw operation and personnel from the remaining areas in order of scheduling capability values from largest to smallest, until the target area meets the demand for operation and maintenance personnel.

The smart gas operation management platform may determine a real-time scheduling policy in various feasible ways based on the scheduling capability value of each area. The real-time scheduling policy may be determined by other ways.

In some embodiments, the smart gas operation management platform may also determine the real-time scheduling policy based on the scheduling cost of at least one area.

The scheduling cost may refer to the cost generated by scheduling operation and maintenance personnel based on the scheduling policy. For example, the time cost, transportation cost for operation and maintenance personnel to travel back and forth, etc. Exemplarily, when the distance between the two areas is long, the time required for the operation and maintenance personnel to schedule between the two areas is longer, which affects the timeliness of scheduling of the operation and maintenance personnel.

In some embodiments, the smart gas operation management platform may determine the scheduling cost based on historical data. For example, the smart gas operation management platform (e.g., the smart gas indoor installation management sub-platform) may obtain historical personnel scheduling records between areas from the smart gas data center and obtain the corresponding scheduling costs.

The smart gas operation management platform may also determine the scheduling cost based on prior knowledge. For example, a prior table of the scheduling cost may be determined according to the geographical location, area size, scheduling distance, etc. of each area. When determining the real-time scheduling policy, based on the positional relationship between the target area and other areas, the scheduling cost may be determined by querying the prior table, and then the real-time scheduling policy may be determined. For example, operation and maintenance personnel are scheduled from areas where the scheduling cost is lower than a preset cost threshold.

In some embodiments, the smart gas operation management platform may construct an area map based on each area of the city, the area map may include nodes and edges, and the scheduling cost may include an edge feature. Among them, the edge feature may include the distance between areas. More descriptions of the area map may be found in FIG. 6 and its related descriptions.

In some embodiments of the present disclosure, the determination of gas installation and the door-to-door service plan may be completed through the Internet of Things system for smart gas installation management, and the user may complete the application and data upload of gas installation online without leaving home, which can avoid tedious offline application and save the cost of the gas installation. The user may further check the progress of the gas installation process in real time on a user side, effectively enhancing the user experience. At the same time, the Internet of Things system for smart gas installation management may determine the door-to-door service plan in a targeted way based on the user requirement and the overall service situation, thereby effectively reducing user's waiting costs. When the count of on-call operation and maintenance personnel in the operation and maintenance area is insufficient, personnel can be temporarily transferred from other operation and maintenance areas based on the dispatching capability value, which can meet the user's maintenance needs in a timely manner. The scheduling capability value of each area is obtained through the plurality of rounds of iterative update, and the real-time scheduling strategy is determined through the scheduling capability value of each region, which helps the scheduling strategy to more fully and accurately consider the interconnections between the regions. At the same time, the introduction of dispatch costs also makes the scheduling strategy more practical.

Figure 3:
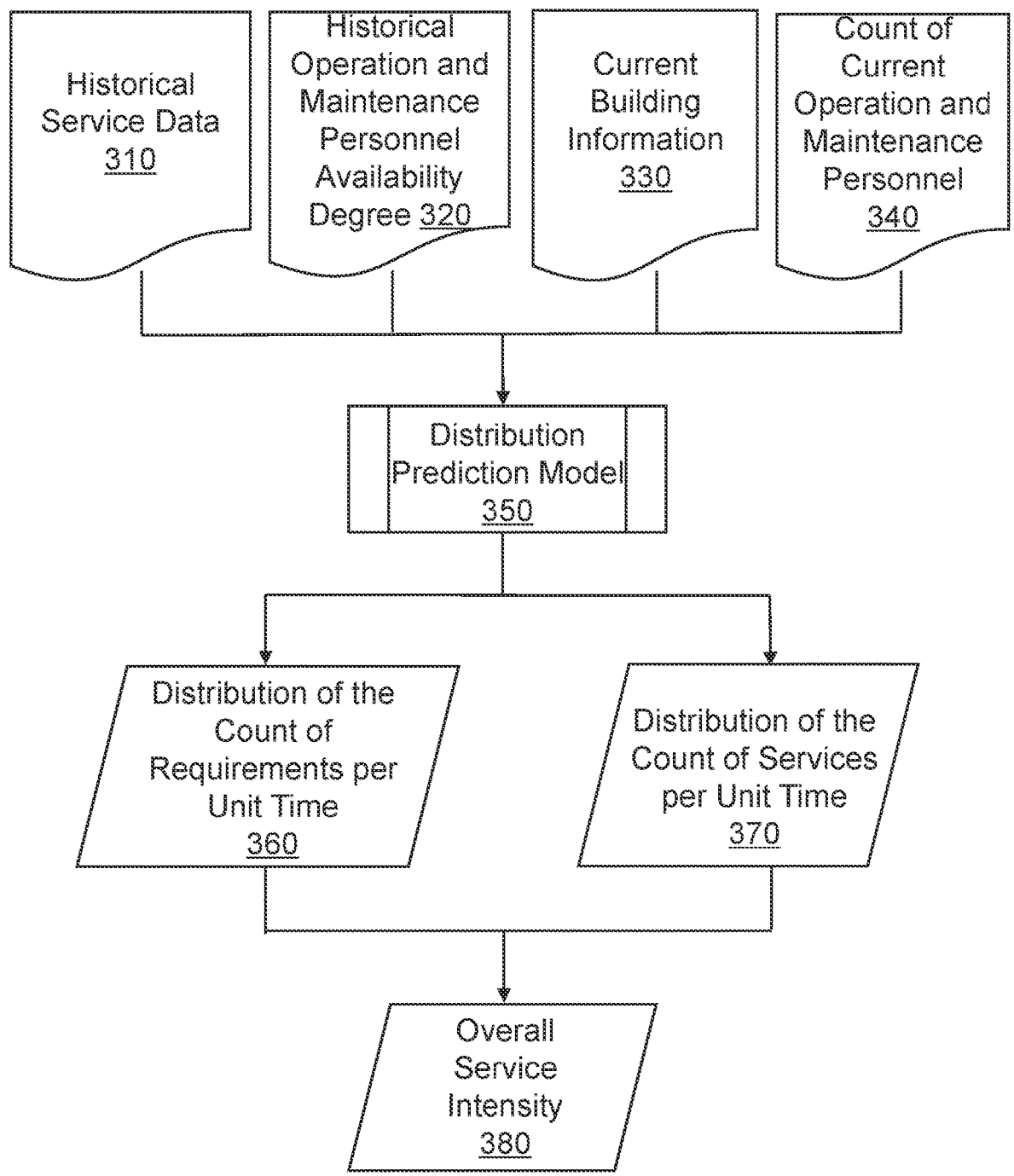
FIG. 3 is an exemplary schematic diagram illustrating determining overall service intensity according to some embodiments of the present disclosure.

FIG. 3 is an exemplary schematic diagram illustrating determining overall service intensity according to some embodiments of the present disclosure.

In some embodiments, the smart gas operation management platform may determine distribution of a count of requirements per unit time of gas installation and distribution of a count of services per unit time of gas installation based on a user requirement and an operation and maintenance personnel availability degree.

The distribution of the count of requirements per unit time may refer to a probability that the count of requirements per unit time is distributed in an interval of the count of requirements. The intervals of the count of requirements may refer to different intervals divided according to different counts of requirements. For example, the interval of the count of requirements may include 0 to 10, 11 to 20, etc., and 0 to 10 may mean that the count of requirements is between 0 and 10 services. For example, the distribution of the count of requirements per unit time may be ([0~10], 0.7), ([11~20], 0.3), indicating that the probability of the count of requirements per unit time being in the interval of the count of requirements of 0~10 is 0.7, and the probability of the count of requirements per unit time being in the interval of the count of requirements of 11~20 is 0.3. Further description regarding the count of requirements per unit time may be found in the operation 230 and related description thereof.

The distribution of the count of requirements per unit time may be obtained by statistical analysis of historical data. An exemplary statistical analysis mode may include, but is not limited to, maximum likelihood estimation, moment estimation, etc.

The distribution of the count of services per unit time may refer to a probability that the count of services per unit time is distributed in an interval of the count of services. The intervals count of services may refer to different intervals divided according to different counts of services. For example, the interval of the count of services may include 0 to 10, 11 to 20, etc. For example, the distribution of the count of services per unit time may be ([0~10], 0.4), ([11~20], 0.6), indicating that the probability that the count of services per unit time being in the interval of the count of services of 0~10 is 0.4, and the probability that the count of services per unit time being in the interval of the count of services of 11~20 is 0.6. Further description regarding the count of services per unit time may be found in the operation 230 and related description thereof.

Similar to the distribution of the count of requirements per unit time, the distribution of the count of requirements per unit time may further be obtained by the statistical analysis of the historical data, which is not be repeated herein.

In some embodiments, the smart gas operation management platform may conduct statistical analysis based on user requirement to determine the distribution of the count of requirements per unit time for gas installation; and conduct data statistical analysis based on the operation and maintenance personnel scheduling condition to determine the distribution of the count of services per unit time for gas installation. The manner of performing the statistical analysis of the data includes, but is not limited to, at least one of descriptive statistics, hypothesis testing, column table analysis, correlation analysis, analysis of variance, regression analysis, cluster analysis, or the like.

In some embodiments, as shown in FIG. 3, the smart gas operation management platform may determine the distribution of the count of requirements per unit time 360 and the distribution of the count of services per unit time 370 by processing historical service data 310 and a historical operation and maintenance personnel availability degree 320, current building information 330, and a count of current operation and maintenance personnel 340 through a distribution prediction model 350.

The distribution prediction model may be a machine learning model. For example, the distribution prediction model may include a recurrent neural networks model, a convolutional neural networks model, other custom model structures, or the like, or any combination thereof.

As shown in FIG. 3, an input of the distribution prediction model 350 may include the historical service data 310, the historical operation and maintenance personnel availability degree 320, the current building information 330, and the count of current operation and maintenance personnel 340, and an output may include the distribution of the count of requirements per unit time 360 and the distribution of the count of services per unit time 370.

The historical service data may include data related to historical acceptance and historical services of gas installation. For example, the historical service data may include a count of accepted services and a count of door-to-door services in the past year.

The historical operation and maintenance personnel availability degree may refer to an operation and maintenance personnel availability degree at a time a historical door-to-door service is performed. For example, the historical operation and maintenance personnel availability degree may refer to an operation and maintenance personnel availability degree for each day in the past year. The historical service data and the historical operation and maintenance personnel availability degree may be determined based on historical service records of the Internet of Things system for smart gas installation management.

The current building information may refer to relevant information of the building in the near future. For example, the current building information may include a count of newly built buildings, transactions, etc. in the last month. The current building information may be obtained from a web database.

The count of current operation and maintenance personnel may refer to a count of operation and maintenance personnel currently available to perform the door-to-door service. For example, the count of current operation and maintenance personnel may include a count of operation and maintenance personnel available to perform the door-to-door services that day.

The distribution prediction model may be obtained based on a large number of first training samples with labels, for example, a plurality of first training samples with first labels may be input to an initial distribution prediction model, a loss function may be constructed from the first labels and a result of the initial distribution prediction model, and parameters of the initial distribution prediction model may be updated iteratively based on the loss function by gradient descent or other modes. The model training may be completed when a preset condition is satisfied, and a trained distribution prediction model may be obtained. The preset condition may be that the loss function converges, a count of iterations reaches a threshold value, etc.

In some embodiments, the first training sample for training the distribution prediction model may include the historical service data, historical building information, the historical operation and maintenance personnel availability degree, and a total count of historical operation and maintenance personnel over a historical time period. The first training sample may be obtained based on historical data. The first label may be the interval of the count of requirements in which an actual average count of requirements per unit time is located and the interval of the count of services in which an actual average count of services per unit time is located in the above historical time period. The first label may be manually labeled. For example, the interval of the count of requirements in which an actual average count of requirements per unit time is located or the interval of the count of services in which an actual average count of services per unit time is located may be labeled as 1, and remaining intervals may be labeled as 0. For example, if the count of requirements per unit time in the historical time period is distributed in an interval of the count of requirements of [11~20], the interval of the count of requirements of [11~20] may be labeled as 1, and remaining intervals of the count of requirements (e.g., [0-10]) as 0, etc.

In some embodiments, the smart gas operation management platform may construct the first training data set based on a preset rule. The first training data set includes a large number of first training samples with a first label. In some embodiments, the preset rule may include: when the difference between an actual average count of requirements per unit time and an actual average count of services per unit time in the historical time period in the first label is larger, the more first training samples labeled with the first label are set in the first training data set.

It should be noted that when the difference between the average count of requirements per unit time and the average count of services per unit time is larger, the overall service intensity is larger, i.e., it indicates that the degree of busyness is larger and the manpower is in short supply. In this case, the subsequent adjustment of the count of operation and maintenance personnel is particularly important, and poor handling can easily cause the user's requirement not to be met in a timely manner, affecting the user's sense of experience. In some embodiments of the present disclosure, when the difference between the actual average count of requirements per unit time and the actual average count of services per unit time in the historical time period in the first label is larger, the more first training samples labeled with the first label are set up in the first training data set for perfecting the training, so as to improve the prediction accuracy of the distribution prediction model when the first training samples may cause a large discrepancy (i.e., the difference between the average count of requirements per unit time and the average count of services per unit time).

In some embodiments, the smart gas operation management platform may determine a loss function based on a weighted sum of the first difference and the second difference corresponding to the at least one first training sample. The weights of the first differences or the second differences corresponding to the different first training samples may be constructed based on a third difference. For example, the larger the third difference, the larger the weight of the first difference or the second difference corresponding to the first training samples.

In some embodiments, the first difference may be a difference between the count of requirements per unit time output by the initial distribution prediction model and the average count of requirements per unit time in the first label. In some embodiments, the second difference may be a difference between the count of services per unit time output by the initial distribution prediction model and the average count of services per unit time in the first label. In some embodiments, the third difference may be a difference between the count of requirements per unit time output by the initial distribution prediction model and the count of services per unit time output by the initial distribution prediction model. Merely by way of example, a loss function may be determined by the following formula (2).

$$\text{Loss}=a_1 \times (L_{x1}+L_{y1})+a_2 \times (L_{x2}+L_{y2})+ \ldots +a_m \times (L_{xm}+L_{ym}) \qquad (2)$$

where Loss is the loss function, m is the count of first training samples, $a_1, a_2, \ldots,$ and $a_m$ are the weights corresponding to the first differences or second differences in different first training samples, $L_x$ is the first difference, $L_y$ is the second difference, $L_{xm}$ is the first difference in the mth first training sample, and $L_{ym}$ is the second difference in the mth first training sample.

In some embodiments of the present disclosure, assigning a greater weight to the first difference or the second difference corresponding to the first training samples when the third difference is larger can further improve the prediction accuracy of the model when the first training samples may cause a large difference (i.e., the difference between the average count of requirements per unit time and the average count of services per unit time).

In some embodiments, as shown in FIG. 3, the smart gas operation management platform may determine the overall service intensity 380 based on the distribution of the count of requirements per unit time 360 and the distribution of the count of services per unit time 370, e.g., the overall service intensity may be determined based on the distribution of the count of requirements per unit time and the distribution of the count of services per unit time through a relevant calculation mode. An exemplary calculation mode is shown in formula (3) below:

$$\rho = \frac{\sum_i \lambda_i p_i}{\sum_k \mu_k q_k} \qquad (3)$$

where ρ denotes the overall service intensity, reflecting busyness of the entire Internet of Things system for smart gas installation management, and the larger the ρ, the greater the busyness, and the more short-personneled.

λ denotes the count of requirements per unit time. λ1, λ2, . . . λi denote different intervals of the count of requirements. p1, p2, . . . pi respectively denotes a probability that the count of requirements is distributed in the corresponding interval of the count of requirements.

i and λ1, λ2, . . . λi may be determined manually, for example, when i=λ1, λ1 denotes the interval of the count of requirements of [0~10], λ2 denotes the interval of the count of requirements of [11~20], . . . λ10 denotes the interval of the count of requirements of [91~100], and λ11 denotes the interval of the count of requirements of above 100, and the probabilities p1~pi may be 5%, 6%, . . . 1%, respectively, indicating the probability of the count of requirements is distributed in the above interval of the count of requirements.

μ denotes the count of services per unit time. μ1, μ2, . . . μk denote different intervals of count of services. q1, q2, . . . qk respectively denotes a the probability that the count of services is distributed in the corresponding interval of the count of services.

k and μ1, μ2, . . . μk may be determined manually, for example, when k=5, μ1 denotes the interval of the count of services of [0~30], μ2 denotes the interval of the count of services of [31~60], . . . μ5 denotes the interval of the count of services of above 150, and the probabilities q1~qk may be 1%, 10%, . . . 2%, respectively, indicating the probability of the count of services is distributed in the above interval of the count of services. i and k may be different values.

In some embodiments of the present disclosure, the distribution of the count of requirements per unit time and the distribution of the count of services per unit time may be determined based on the distribution prediction model, so that the overall service intensity may be reasonably predict, thereby avoiding overloading of the platform and users waiting too long, and further improving the user experience.

Figure 4:
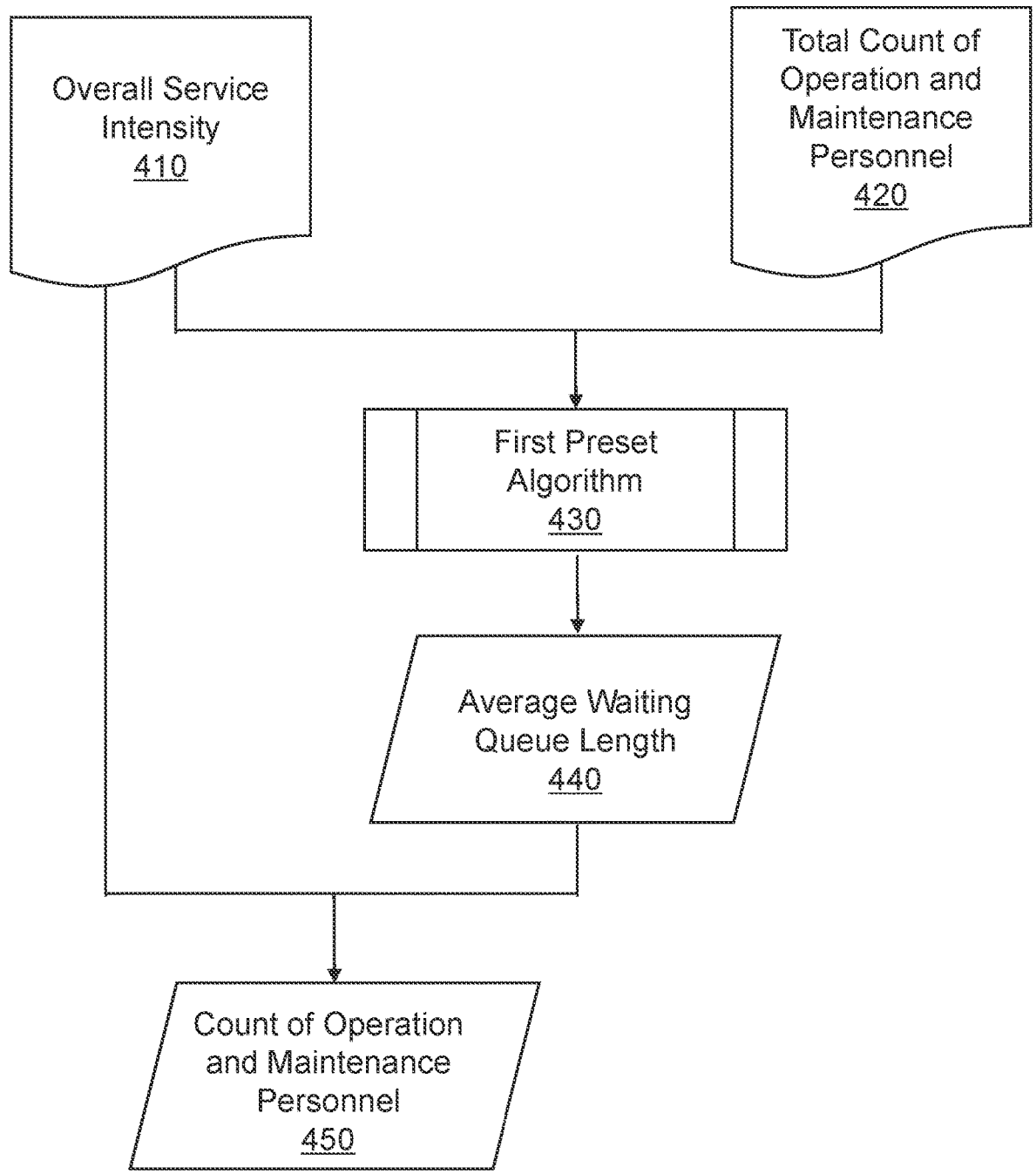
FIG. 4 is an exemplary schematic diagram illustrating adjusting a count of operation and maintenance personnel according to some embodiments of the present disclosure.

FIG. 4 is an exemplary schematic diagram illustrating adjusting a count of operation and maintenance personnel according to some embodiments of the present disclosure.

In some embodiments, as shown in FIG. 4, the smart gas operation management platform may determine an average waiting queue length 440 based on overall service intensity 410 and a total count of operation and maintenance personnel 420 through a preset algorithm 430; and adjust a count of operation and maintenance personnel 450 based on the overall service intensity 410 and the average waiting queue length 450. For a more detailed description of the overall service intensity, see the previous related description.

The average waiting queue length may refer to an average count of services that each user needs to wait for. For example, if there are 5 users a, b, c, d, and e, where a, b and c are in a queue corresponding to operation and maintenance personnel A, and d and e are in a queue corresponding to operation and maintenance personnel B, then the count of services that the 5 users need to wait for may be 1, 1, 2, 0 and 1, respectively, and then the average waiting queue length may be the average count of services of 1 service.

In some embodiments, the smart gas operation management platform may perform statistical analysis on a historical queuing situation to determine an average waiting queue length. For example, the queuing situation of all users over the past 100 days may be counted and an average value of the waiting queue length of each of all the users may be used as the average waiting queue length.

The preset algorithm may refer to an algorithm that estimates the average waiting queue length according to a certain rule.

In some embodiments, under a certain assumed condition, the smart gas operation management platform may determine the average waiting queue length through the preset algorithm based on the overall service intensity and the total count of operation and maintenance personnel. The assumed condition may include that a count of persons that can be accommodated in the queue is infinite, a submission time of the user requirement follows Poisson Distribution, and a time of the operation and maintenance personnel performing a door-to-door service follows Negative Exponential Distribution, and a plurality of operation and maintenance personnel serve in parallel. Serving in parallel may mean that different operation and maintenance personnel can provide door-to-door services to different users respectively at the same time.

Merely by way of example, formula (4) of the preset algorithm is as follows.

$$L_s = s\rho + \frac{(s\rho)^s \rho}{s!(1-\rho)^2} \rho_0 \qquad (4)$$

where $L_s$ denotes the average waiting queue length, s denotes the total count of operation and maintenance personnel, p denotes the overall service intensity, $\rho_0$ denotes a probability that all operation and maintenance personnel are available, and the exemplary formula (5) of $\rho_0$ is as follows:

$$\rho_0 = \left[ \sum_{k=0}^{s-1} \frac{(s\rho)^k}{k!} + \frac{(s\rho)^s}{s!(1-\rho)} \right]^{-1} \qquad (5)$$

where k may be any integer value from 0, 1, 2 . . . to s−1 in turn.

In some embodiments, the smart gas operation management platform may comprehensively score to form a service score of the Internet of Things system for smart gas installation management based on the overall service intensity and the average waiting queue length. The service score may be negatively correlated with the overall service intensity and negatively correlated with the average waiting queue length. For example, the larger the overall service intensity, the smaller the service score. As another example, the longer the average waiting queue length, the smaller the service score. When the service score is smaller than a score threshold, the total count of operation and maintenance personnel may be increased until the service score is greater than or equal to the score threshold. The score threshold may be a system default value, an empirical value, a manually pre-set value, or the like, or any combination thereof, which may be set according to an actual requirement, and is not limited in the present disclosure.

In some embodiments of the present disclosure, by adjusting the total count of operation and maintenance personnel, the overall service intensity and average waiting queue length of the smart gas installation management platform may be kept within a certain range, thereby avoiding the overloading of the platform and the users waiting too long, and further enhancing the user experience.

Figure 5:
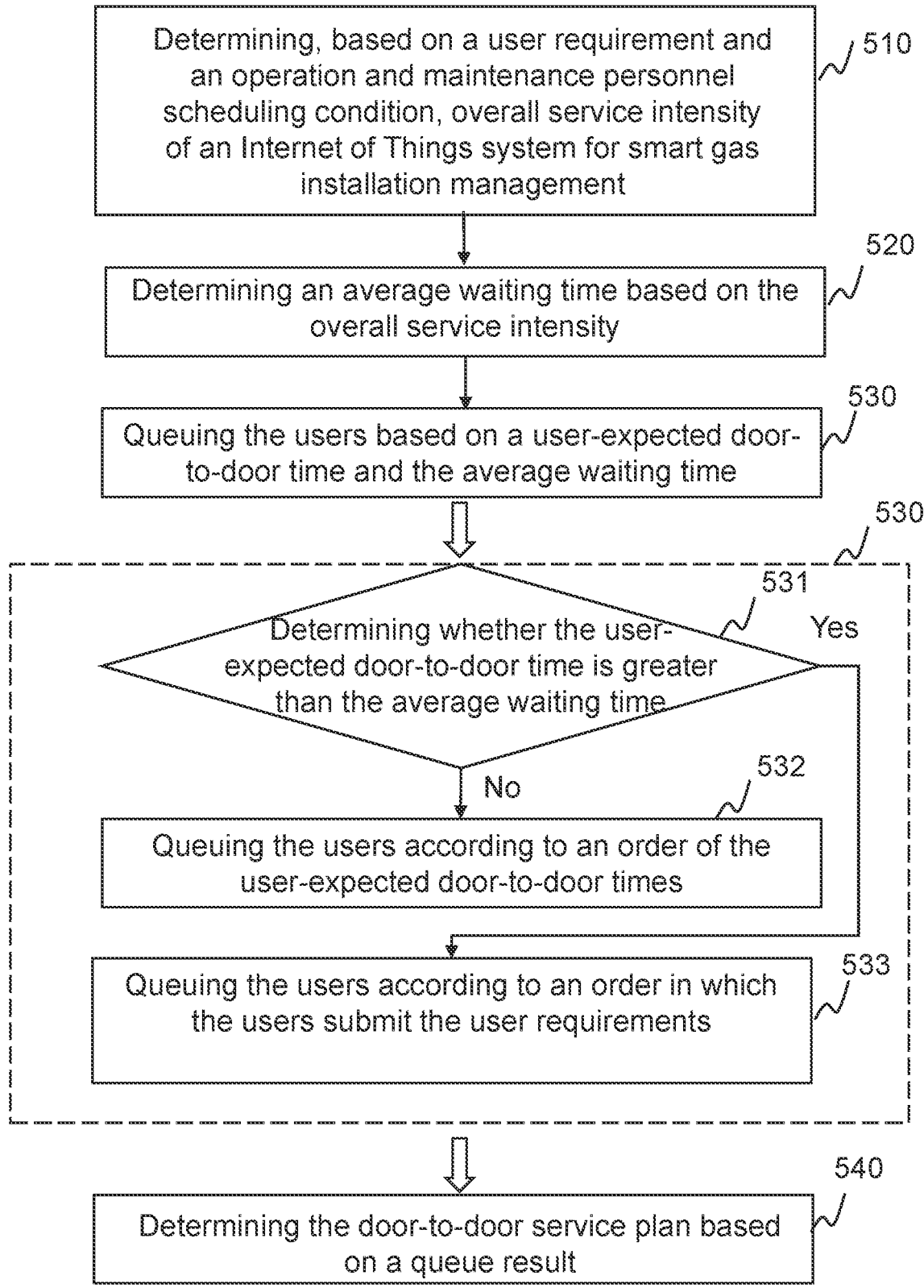
FIG. 5 is a flowchart illustrating an exemplary process for determining a door-to-door service plan according to some embodiments of the present disclosure.

FIG. 5 is a flowchart illustrating an exemplary process for determining a door-to-door service plan according to some embodiments of the present disclosure.

In 510, determining, based on a user requirement and an operation and maintenance personnel scheduling condition, overall service intensity of an Internet of Things system for smart gas installation management.

In 520, determining an average waiting time based on the overall service intensity.

The average waiting time may refer to an average value of time it takes for each user waiting for a door-to-door service. For example, if 2 users, A, and B spend 1 hour and 3 hours waiting for a door-to-door service, respectively, the average waiting time may be 2 hours.

In some embodiments, the smart gas operation management platform may determine the average waiting time by performing statistical analysis on historical data. For example, the waiting times of all users over the past 10 days may be calculated and an average value of the waiting times of all the users may be used as the average waiting time.

In some embodiments, the smart gas operation management platform may determine the average waiting time through a second preset algorithm based on the average waiting queue length, the user requirement, and the operation and maintenance personnel personnel availability degree. To distinguish from the preceding preset algorithm for determining the average waiting queue length, the preceding preset algorithm may be referred to as a first preset algorithm, and the preset algorithm for determining the average waiting time herein may be referred to as a second preset algorithm.

The second preset algorithm may refer to an algorithm that calculates the average waiting time according to a certain rule. Merely by way of example, the formula (6) of the second preset algorithm is as follows.

$$W_q = W_S - \frac{1}{\mu} \qquad (6)$$

where $W_q$ denotes the average waiting time, $\mu$ denotes the count of services per unit time, $W_S$ denotes a sojourn time (i.e., the time from a moment the user applies for a service to a moment the gas installation service is completed), and the exemplary calculation formula (7) of $W_S$ is as follows.

$$W_S = \frac{L_S}{\lambda} \qquad (7)$$

where $\lambda$ denotes the count of requirements per unit time, $L_S$ denotes the average waiting queue length. Further description regarding the average waiting queue length, the user requirement, and the operation and maintenance personnel availability degree may be found in FIG. 2 and related description thereof.

In 530, queuing the users based on a user-expected door-to-door time and the average waiting time.

How the users queue is illustratively described through the operations 531-533 as follows.

In 531, determining whether the user-expected door-to-door time is greater than the average waiting time.

The user-expected door-to-door time may be input by the user in the smart gas user platform.

In some embodiments, the smart gas operation management platform may determine whether the user-expected door-to-door time is greater than the average waiting time. For example, if the user submits a user requirement at 11:00, the user-expected door-to-door time is 14:00 (i.e., the user-expected door-to-door time is in 3 h), and the average waiting time is 2 h, the user-expected door-to-door time (3 h) is greater than the average waiting time (2 h).

In 532, in response to a determination that the user-expected door-to-door time is smaller than or equal to the average waiting time, queuing the users according to an order of the user-expected door-to-door times.

The order of the user-expected door-to-door times (hereafter referred to as a first order) may refer to an order obtained by arranging the user-expected door-to-door times in order. For example, if user A's user-expected door-to-door time is 13:00, user B's user-expected door-to-door time is 12:00, and user C's user-expected door-to-door time is 14:00, the first order may be: user B>user A>user C. ">" denotes time priority.

In some embodiments, the smart gas operation management platform may queue the users according to the first order when the user-expected door-to-door time is smaller than or equal to the average waiting time. When the user-expected door-to-door time is smaller than or equal to the average waiting time, the smart gas operation management platform may prioritize the door-to-door service for a top-ranked user in the first order. For example, if the average waiting time is 3.5 h and a current time is 11:00, the expected door-to-door times of user A and user B in the above example are smaller than or equal to the average waiting time, the door-to-door service may be provided to user B first according to the first order, and then to user A and user C in turn.

In 533, in response to a determination that the user-expected door-to-door time is greater than the average waiting time, queuing the users according to an order in which the users submit the user requirements.

The order in which the users submit the user requirements (hereafter referred to as a second order) may refer to an order in which the users submit the user requirements in terms of time. For example, for user A, user B, and user C in the above example, if user A submits a user requirement (i.e., applying for gas installation) at 11:00, user B submits a user requirement at 09:30, and user C submits a user requirement at 10:00, the second order may be: user B>user C>user A. ">" denotes time priority.

In some embodiments, when the user-expected door-to-door time is greater than the average waiting time, the smart gas operation management platform may queue the users according to the order in which the users submit the user requirements. When the user-expected door-to-door time is greater than the average waiting time, the smart gas operation management platform may prioritize door-to-door service for a top-ranked user in the second order. For example, if the average waiting time is 0.5 h and a current time is 11:00, and the expected door-to-door times of user A, user B, and user C in the above example are greater than the average waiting time, the door-to-door service may be provided to user B first according to the second order, and then to user C and user A in turn.

In 540, determining the door-to-door service plan based on a queue result.

The queue result may refer to a result of queuing the users based on first order or the second order. For example, the queue result may be user B>user A>user C.

In some embodiments, the smart gas operation management platform may determine the door-to-door service plan based on the queue result. For example, when the user-expected door-to-door time is smaller than or equal to the average waiting time, the smart gas operation management platform may queue the users according to the queue result of the first order. When the expected door-to-door time is greater than the average waiting time, the smart gas operation management platform may queue the users according to the queue result of the second order, which will not be repeated herein.

In some embodiments of the present disclosure, the users may be queued according to different orders based on the expected door-to-door time and average waiting time, so that the user requirements may be sorted according to urgency, a user with an urgent need may be prioritized, and a user with a less urgent need may be queued in a first-come, first-served manner, which can optimize resource allocation and ensure user experience.

Figure 6:
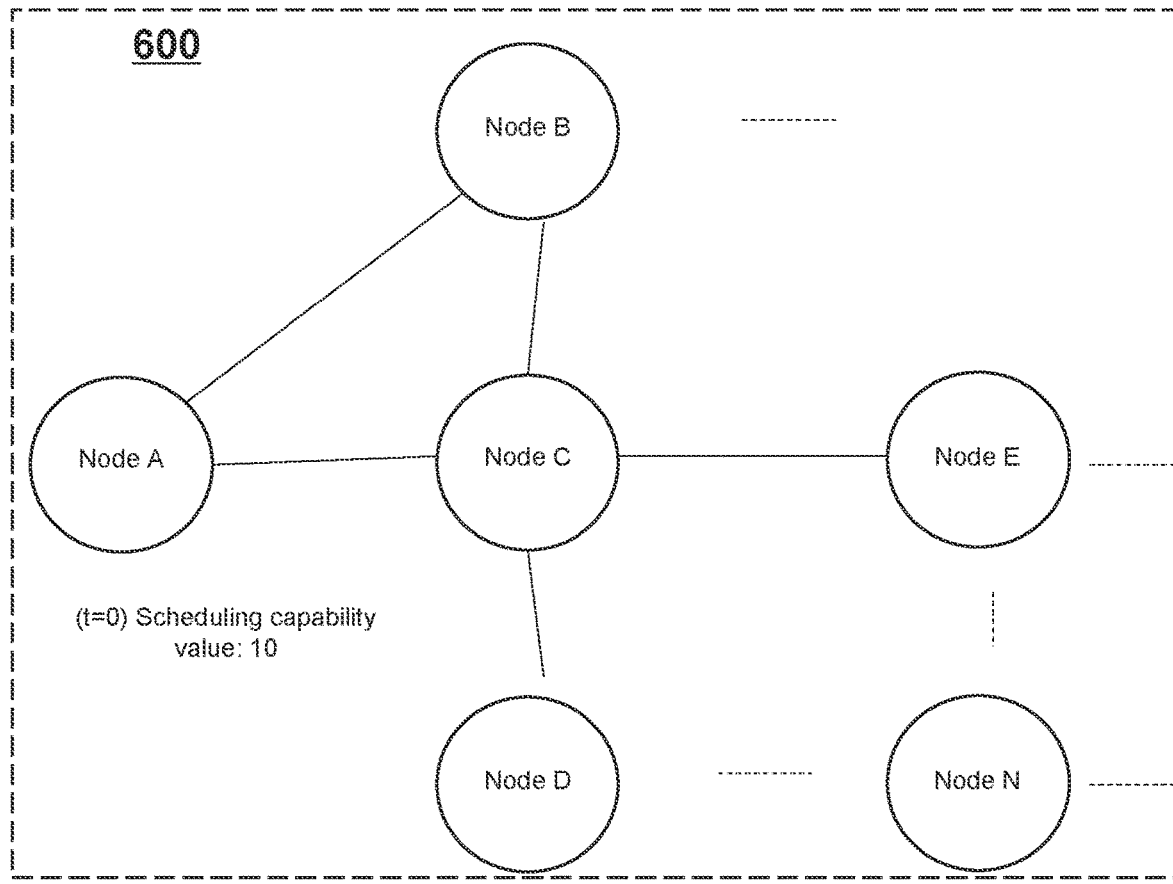
FIG. 6 is an exemplary schematic diagram illustrating determining a scheduling capability value according to some embodiments of the present disclosure.

FIG. 6 is an exemplary schematic diagram illustrating determining a scheduling capability value according to some embodiments of the present disclosure.

In some embodiments, the smart gas operation management platform may construct an area map based on relevant information of the at least one operation and maintenance area; determine an initial scheduling capability value of the each of the nodes in the area map, perform a plurality of rounds of iterative update on the initial scheduling capability value, wherein when the scheduling capability value being updated meets a preset end condition, the update ends, and a scheduling capability value of the each of the nodes is obtained.

The area map may refer to a map constructed based on the relevant information of each area of the city. The area map may represent the relationship between the scheduling capabilities of the areas. In some embodiments, the smart gas operation management platform may obtain the count of on-call operation and maintenance personnel in each area of the city and the positional relationship between the various areas to construct an area map from the smart gas data center.

The area map may include multiple nodes and multiple edges. Among them, the node denotes operation and maintenance areas, and nodes may be connected to form edges, which represent the relationship between two connected nodes.

As shown in FIG. 6, the area map 600 may include node A, node B, node C, node D, node E . . . and node N, respectively, representing preset area A, area B, area C, area D, area E . . . area N (other nodes not shown).

The features of the node may include a count of on-call personnel in the operation and maintenance area. For example, the count of on-call personnel in operation and maintenance area A is 10, and the feature of node A may include the count of on-call personnel n=10.

In some embodiments, the features of the node may further include a scheduling capability value, which represent the scheduling capability of the on-call operation and maintenance personnel in the corresponding area. The scheduling capability value may be positively related to the count of on-call personnel in the area, as described below.

The edge of the area map may be generated based on the connection of nodes represented by any two areas that may be connected to each other. As shown in FIG. 6, the edge AC in the area map 600 may be generated by the connection of node A and node C, and the edge BC may be generated by the connection of node B and node C.

A feature of edge may include a distance between nodes. For example, if the distance between area A and area C is 5 km, the feature of the edge AC may include S=5 km. In some embodiments, the distance may be determined based on the length of the road that communicates between area A and area C. When there are multiple interconnecting roads, the distance may be determined based on the length of the shortest road.

In some embodiments, the edge feature may further include a weight value. The weight value may be related to the household features of the two nodes connected by the edge. The weight value of the edge is the value preset by the system.

The household feature is a feature that is relevant to reflecting information about household in a given area. The household information may be household size information, household distribution information, or household person type information. For example, a household feature may be that area A has a majority of elderly people, area B is more densely populated, or area C has 80 households. Another example is that the household feature may include a distribution or count of industrial gas users, commercial gas users, and ordinary residential gas users in each area. The household feature may reflect the severity of the gas leakage that may cause injury or death. For example, the higher the population density of the area in which the households are located, the higher the severity of the potential casualties caused by the gas leakage. In some embodiments, the household feature may also include whether the residence is an elevator house or a walk-up house, the degree of ventilation of the residence, or the like. Poor ventilation or an elevator ride may cause an explosion in the event of a gas leakage, and therefore, poorly ventilated areas as well as areas with elevator house occupants may have a higher severity of injury or death in the event of a gas leakage.

The smart gas operation management platform may analyze and process the area map 600 to determine the scheduling capability value of each node. In some embodiments, the smart gas operation management platform may update the scheduling capability value of each node in the area map 600 through multiple rounds of iterative processing based on a third preset algorithm. For each node of at least one node, the smart gas operation management platform may determine the updated scheduling capability value of the node based on a scheduling capability value to be updated of the node, a scheduling capability value to be updated of each of other nodes directly connected to the node, and a value of an edge between the node and each of other nodes directly connected to the node. The following may describe the multi-round of update based on the third preset algorithm.

During the initialization operation, the scheduling capability value to-be-updated of each node may be the initial scheduling capability value. The initial scheduling capability value of each node may be obtained based on the following formula (8)

$$V(p_i; 0) = \frac{N_i}{\text{degree}(p_i)} \tag{8}$$

Among them, the $V(p_i; 0)$ denotes the scheduling capability value of the node i during the initialization operation. The $N_i$ denotes the count of on-call operation and maintenance personnel for the node i. The $\text{degree}(p_i)$ denotes the degree of the node i, which may be determined based on the count of edges of a node connected to node i. As shown in FIG. 6, the nodes connected to node A may include node B and node C, and the edges are AC and AB, then the degree of node A is 2. The nodes connected to node C may include node A, node B, node D and node E, the edges are AC, BC, CD and CE, respectively, then the degree of node C is 4. Similarly, the degrees of nodes B, D, and E are 2, 1, and 1, respectively.

As shown in FIG. 6, the count of on-call operation and maintenance personnel of node A, node B, node C, node D, and node E are 10, 8, 0, 5, and 6, respectively, and the degrees of nodes are 2, 2, 4, 1 and 1, respectively, and thus the initial scheduling capability value V is 5, 4, 0, 5, and 6, respectively, based on formula (8) during the initialization operation.

It can be understood that when the count of on-call operation and maintenance personnel for a node i is $N_i$=0, the scheduling capability value of the node is 0.

In some embodiments, the smart gas operation management platform may use the updated scheduling capability value of the node as a scheduling capability value to be updated of the node in a next iteration, and calculate based on the preset formula to update the to-be-updated scheduling capability value of each node.

Exemplarily, after the initial scheduling capability value of each node is determined in the initialization operation, in the first round and each subsequent round of iterations, that is, at time t+1, the scheduling capability value of node i to be updated may be calculated by the following formula (9):

$$V(p_i; t+1) = V(p_i; t) + d \sum_{p_j \in M(p_i)} \frac{\Delta V(p_j; t)}{w(p_i, p_j)} \quad (9)$$

Among them, in formula (9), the $V(p_i;t+1)$ denotes the scheduling capability value of node i at time t+1. When the count of on-call operation and maintenance personnel of node i is 0, the $V(p_i;t+1)$ is 0, that is, a node with 0 on-call operation and maintenance personnel always has no ability to schedule outwards.

The $V(p_i; t)$ in formula (9) denotes the scheduling capability value of node i after iteration at time t (the last round), and the d denotes a damping coefficient, which may be a preset value, for example, d=0.2.

The $M(p_i)$ denotes a set of nodes connected to node i, where the node $p_j$ denotes each node in the set $M(p_i)$. As shown in FIG. 6, for node C, the node $p_j$ includes node A, node B, node D, and node E, and the $M(p_i)$ denotes a node set formed by the above nodes.

The $\Delta V(p_j;t)$ in formula (9) denotes the change (difference value) between the updated scheduling capability value of each node p; after iteratively updated in the previous round (time t) and the scheduling capability value before the update. Exemplarily, it may be determined by the following formula (10):

$$\Delta V(p_j;t) = V(p_j;t) - V(p_j;t-1) \quad (10)$$

In formula (10), the change $\Delta V(pat)$ of the scheduling capability value of node $p_j$ at time t is the difference between the scheduling capability value $V(p_j; t)$ after node $p_j$ is updated at time t and the scheduling capability value before the update at time t. It can be understood that the scheduling capability value before the update at time t is the scheduling capability value $V(p_j;t-1)$ after the update at time t−1. It should be noted that when the first round of iteration t=0, the variation is the initial scheduling capability value of the node determined by formula (8).

The $w(p_i, p_j)$ in formula (9) denotes a weight value, which may be determined based on the weight feature value of the edge connecting node i and node $p_j$. In some embodiments, the weight value may be determined by the following formula (11)

$$w(p_i, p_j) = \frac{k}{S} \quad (11)$$

Wherein, k in formula (11) may be a preset coefficient greater than 0, for example k=5 km. S denotes the distance between node i and node $p_j$, which may be determined based on the feature values of the edges in the area map 600. As shown in FIG. 6, the distance between node A and node C may be 5 km, and the feature of edge AC include S=5 km, so the weight value may be 5/5=1.

In the above formula (9), the weight value may also be determined based on other suitable ways. For example, the weight value may also be determined by introducing other preset factors other than distance. For example, the weight value may also be determined based on the household features of the two nodes (i.e., node i and node j) connected by an edge. The ways of determining the weight value are not limited herein.

In formula (9), the $$\sum_{p_j \in M(p_i)} \frac{\Delta V(p_j; t)}{w(p_i, p_j)}$$

denotes the sum of the ratios of the change values of the scheduling capability values to the weight values of all the nodes $p_j$ connected to the node $p_i$ at time t (i.e., the previous iteration). Based on the formula (9), the nodes in the area map 600 may be iteratively updated for multiple rounds, and the scheduling capability value of each node to be updated may be gradually updated.

In some embodiments, the smart gas operation management platform may repeat the above formula (9) for multiple rounds of iterations to obtain the final scheduling capability value of each node, wherein the termination condition of the iterative update may be that the count of iterations reaches a preset count of thresholds.

In some embodiments, the termination condition of the iterative update may also be that the sum of the absolute values of the differences between the scheduling capability values of all nodes at two adjacent moments (two adjacent iterations) is less than a preset threshold. Exemplarily, the termination condition of the iteration may be determined based on the following formula (12):

$$\sum_{p_i \in G} |V(p_i;t+1) - V(p_i;t)| < \varepsilon \quad (12)$$

Among them, G denotes the set composed of all nodes, and $\varepsilon$ denotes the preset threshold.

In some embodiments, the smart gas operation management platform may generate a scheduling arrangement based on the updated scheduling capability value of each node in the area map 600. For example, the scheduling arrangement may be determined based on the proportional relationship of the scheduling capability value of each node. More descriptions may be found in FIG. 2 and its related descriptions.

Some embodiments of the present disclosure are based on area maps, and the scheduling capacity value of each area may be determined by a predetermined algorithm, which may reflect the relationship of the scheduling capacity of each area more intuitively and effectively, and also improve the efficiency of obtaining the scheduling capacity value of each area, providing an effective basis for determining the scheduling arrangement of operation and maintenance personnel.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amend- ments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or feature described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for scheduling operation and maintenance personnel based on an Internet of Things (IoT) system for smart gas installation management, wherein the Internet of Things system includes a smart gas user platform, a smart gas service platform, a smart gas operation management platform, a smart gas sensor network platform, and a smart gas object platform that interact in sequence, the smart gas user platform is configured as a terminal device, the terminal device includes a desktop computer, a tablet computer, a laptop computer, and a mobile phone, the smart gas service platform is a platform for receiving and transmitting data and/or information, the smart gas data center aggregates and stores all operation data of the IoT system for smart gas installation management, the smart gas indoor installation management sub-platform includes an installation requirement management module, an engineering plan management module, and a business tracking management module, the smart gas sensor network platform is configured as a communication network and a gateway, the smart gas object platform is configured as a gas device and a device related to implementation of installation engineering, the smart gas object platform includes a smart gas indoor installation engineering object sub-platform and a smart gas indoor device object sub-platform, the method is implemented based on the smart gas operation management platform, and the method comprises:

obtaining user installation information of at least one operation and maintenance area uploaded by the smart gas user platform through the smart gas service platform;

determining, based on the user installation information and an acceptance condition, target installation information of the at least one operation and maintenance area, generating a personnel query instruction, and sending the personnel query instruction to the smart gas indoor installation engineering object sub-platform for execution, the personnel query instruction being used to obtain an operation and maintenance personnel scheduling condition of the at least one operation and maintenance area;

processing historical service data, a historical operation and maintenance personnel availability degree, current building information, and a current count of operation and maintenance personnel using a distribution prediction model to determine distribution of a count of requirements per unit time and distribution of a count of services per unit time, wherein the distribution prediction model is a machine learning model, the distribution prediction model is obtained based on a plurality of first training samples with first labels, and a training of the distribution prediction model includes:
inputting the plurality of first training samples with the first labels to an initial distribution prediction model, constructing a loss function from the first labels and a result of the initial distribution prediction model, and updating parameters of the initial distribution prediction model iteratively based on the loss function by gradient descent, obtaining a trained distribution prediction model when a preset condition is satisfied;
the plurality of first training samples include the historical service data, historical building information, the historical operation and maintenance personnel availability degree, and a total count of historical operation and maintenance personnel over a historical time period; and
the first labels include an interval of the count of requirements in which an actual average count of requirements per unit time is located and an interval of the count of services in which an actual average count of services per unit time is located in the historical time period;
determining overall service intensity based on the distribution of the count of requirements per unit time and the distribution of the count of services per unit time, the overall service intensity referring to work intensity of the IoT system for smart gas installation providing a door-to-door service;
based on the overall service intensity, adjusting a count of operation and maintenance personnel and updating the operation and maintenance personnel scheduling condition;
determining, based on user requirement and an updated operation and maintenance personnel scheduling condition, a door-to-door service plan for the at least one operation and maintenance area, the door-to-door service plan including a door-to-door time, door-to-door personnel, and a door-to-door service content corresponding to the target installation information;
determining, based on the target installation information and a historical comprehensive count of on-call personnel of the at least one operation and maintenance area, an important point and a secondary point of the at least one operation and maintenance area, as well as a first collection frequency of a gas metering device configured at the important point, and a second collection frequency of a gas metering device configured at the secondary point; wherein the important point is related to a target installation address corresponding to the target installation information, and the secondary point is related to other reporting location in the operation and maintenance area;
obtaining collection data of the gas device configured in the operation and maintenance area uploaded by the smart gas indoor device object sub-platform through the smart gas sensor network platform, and determining a gas-related feature of the operation and maintenance area based on the collection data;
determining a count of on-call personnel of the at least one operation and maintenance area based on the gas-related feature of the at least one operation and maintenance area, the target installation information, and the door-to-door service plan;

in response to a determination that there is at least one operation and maintenance area satisfying a preset scheduling condition, constructing an area map based on relevant information of the at least one operation and maintenance area, wherein the area map includes a plurality of nodes and a plurality of edges, the nodes represent the at least one operation and maintenance area, and the edges represent a relationship between two connected nodes, features of each of the nodes include a count of on-call personnel of an operation and maintenance area corresponding to the node, features of each of the edges include a distance between two nodes connected by the edge and a weight value, the weight value is related to household features of the two nodes connected by the edge;
determining an initial scheduling capability value of each of the nodes in the area map, performing a plurality of rounds of iterative update on the initial scheduling capability value, wherein when the scheduling capability value being updated meets a preset end condition, the update ends, a scheduling capability value of each of the nodes is obtained, the scheduling capability value reflects an ability to dispatch operation and maintenance personnel to other operation and maintenance areas, and the plurality of rounds of iterative update include:
in a first round: determining the initial scheduling capability value of each of the nodes in the area map, and a scheduling capability value to be updated of each of the nodes is the initial scheduling capability value of each of the nodes in the area map; and
in a $t^{th}$ round (t being larger than 1): updating the scheduling capability value to be updated of each of the nodes based on a preset algorithm, using an updated scheduling capability value of each of the nodes in the $t^{th}$ round as a scheduling capability value to be updated of each of the nodes in a $(t+1)^{th}$ round, wherein an updated scheduling capability value of a node in the $t^{th}$ round is determined based on an updated scheduling capability value of the node in the $(t-1)^{th}$ round, a change value between an updated scheduling capability value of a node connected to the node and a scheduling capability value before update of the node connected to the node, and a feature of an edge connected the node;
based on the scheduling capability value of the at least one operation and maintenance area, determining a real-time scheduling instruction and issuing the real-time scheduling instruction to the smart gas indoor installation engineering object sub-platform for execution, the real-time scheduling instruction including scheduling arrangement for on-call personnel in different operation and maintenance areas, and the scheduling arrangement including sorting scheduling capability values of neighboring areas from high to low, and dispatching a corresponding count of on-call operation and maintenance personnel from the neighboring areas to an area to be scheduled according to an order from high to low, until the count of on-call operation and maintenance personnel in the area to be scheduled meets a preset count; and
in response to compensation time off information uploaded by the smart gas indoor installation engineering object sub-platform, updating the scheduling capability value of the at least one operation and maintenance area, and adjusting the real-time scheduling instruction.

2. The method according to claim 1, wherein the determining, based on user requirement and an updated operation and maintenance personnel scheduling condition, a door-to-door service plan for the at least one operation and maintenance area includes:
  determining a user requirement based on the target installation information; and
  determining the door-to-door service plan based on the user requirement and the operation and maintenance personnel scheduling condition.

3. The method according to claim 1, wherein the determining, based on the user requirement and the operation and maintenance personnel scheduling condition, overall service intensity of the Internet of Things system includes:
  determining, based on the user requirement and the operation and maintenance personnel scheduling condition, the distribution of the count of requirements per unit time for gas installation and the distribution of the count of services per unit time; and
  determining the overall service intensity based on the distribution of the count of requirements per unit time and the distribution of the count of services per unit time.

4. The method according to claim 1, wherein the based on the overall service intensity, adjusting a count of operation and maintenance personnel includes:
  determining an average waiting queue length based on the overall service intensity and a total count of operation and maintenance personnel through a preset algorithm;
  forming a service score based on the overall service intensity and the average waiting queue length; and
  in response to the service score being smaller than a score threshold, increasing the total count of operation and maintenance personnel until the service score is greater than or equal to the score threshold.

5. The method according to claim 2, wherein the determining the door-to-door service plan based on the user requirement and the operation and maintenance personnel scheduling condition includes:
  determining, based on the user requirement and the operation and maintenance personnel scheduling condition, overall service intensity of the Internet of Things system;
  determining an average waiting time based on the overall service intensity;
  queuing users based on user-expected door-to-door times and the average waiting time, including:
    in response to a determination that the user-expected door-to-door times are smaller than or equal to the average waiting time, queuing the users in an order of the user-expected door-to-door times;
    in response to a determination that the user-expected door-to-door times are greater than the average waiting time, queuing the users in an order in which the users submit user requirements; and
  determining the door-to-door service plan based on a queuing result.

6. The method according to claim 1, wherein the determining a count of on-call personnel of the at least one operation and maintenance area based on the gas-related feature of the at least one operation and maintenance area, the target installation information, and the door-to-door service plan includes:
  determining, based on the gas-related feature of the at least one operation and maintenance area, an alert vector of the at least one operation and maintenance area, the alert vector including a leakage alert value; and
  determining the count of on-call personnel of the at least one operation and maintenance area based on the alert vector of the at least one operation and maintenance area, the target installation information, and the door-to-door service plan.

7. The method according to claim 6, wherein the alert vector also includes a gas cut-off alert value, the gas-related feature includes a gas facility feature; and the determining, based on the gas-related feature of the at least one operation and maintenance area, an alert vector of the at least one operation and maintenance area includes:
  determining a gas cut-off alert value of the at least one operation and maintenance area based on a gas facility feature of the at least one operation and maintenance area, wherein the gas facility feature includes a type of a gas meter and a wear degree of a wiring.

8. A system for scheduling operation and maintenance personnel based on an Internet of Things (IoT) system for smart gas installation management, wherein the Internet of Things system includes a smart gas user platform, a smart gas service platform, a smart gas operation management platform, a smart gas sensor network platform, and a smart gas object platform that interact in sequence, the smart gas user platform is configured as a terminal device, the terminal device includes a desktop computer, a tablet computer, a laptop computer, and a mobile phone, the smart gas service platform is a platform for receiving and transmitting data and/or information, the smart gas data center aggregates and stores all operation data of the IoT system for smart gas installation management, the smart gas indoor installation management sub-platform includes an installation requirement management module, an engineering plan management module, and a business tracking management module, the smart gas sensor network platform is configured as a communication network and a gateway, the smart gas object platform is configured as a gas device and a device related to implementation of installation engineering, the smart gas object platform includes a smart gas indoor installation engineering object sub-platform and a smart gas indoor device object sub-platform, and the smart gas operation management platform is configure to:
  obtain user installation information of at least one operation and maintenance area uploaded by the smart gas user platform through the smart gas service platform;
  determine, based on the user installation information and an acceptance condition, target installation information of the at least one operation and maintenance area, generating a personnel query instruction, and sending the personnel query instruction to the smart gas indoor installation engineering object sub-platform for execution, the personnel query instruction being used to obtain an operation and maintenance personnel scheduling condition of the at least one operation and maintenance area;
  process historical service data, a historical operation and maintenance personnel availability degree, current building information, and a current count of operation and maintenance personnel using a distribution prediction model to determine distribution of a count of requirements per unit time and distribution of a count of services per unit time, wherein the distribution prediction model is a machine learning model, the distribution prediction model is obtained based on a plurality of first training samples with first labels, and a training of the distribution prediction model includes:
  inputting the plurality of first training samples with the first labels to an initial distribution prediction model, constructing a loss function from the first labels and a result of the initial distribution prediction model, and updating parameters of the initial distribution prediction model iteratively based on the loss function by gradient descent, obtaining a trained distribution prediction model when a preset condition is satisfied;
  the plurality of first training samples include the historical service data, historical building information, the historical operation and maintenance personnel availability degree, and a total count of historical operation and maintenance personnel over a historical time period; and
  the first labels include an interval of the count of requirements in which an actual average count of requirements per unit time is located and an interval of the count of services in which an actual average count of services per unit time is located in the historical time period;
determine overall service intensity based on the distribution of the count of requirements per unit time and the distribution of the count of services per unit time, the overall service intensity referring to work intensity of the IoT system for smart gas installation providing a door-to-door service;
based on the overall service intensity, adjust a count of operation and maintenance personnel and update the operation and maintenance personnel scheduling condition;
determine, based on user requirement and an updated operation and maintenance personnel scheduling condition, a door-to-door service plan for the at least one operation and maintenance area, the door-to-door service plan including a door-to-door time, door-to-door personnel, and a door-to-door service content corresponding to the target installation information;
determine, based on the target installation information and a historical comprehensive count of on-call personnel of the at least one operation and maintenance area, an important point and a secondary point of the at least one operation and maintenance area, as well as a first collection frequency of a gas metering device configured at the important point, and a second collection frequency of a gas metering device configured at the secondary point; wherein the important point is related to a target installation address corresponding to the target installation information, and the secondary point is related to other reporting location in the operation and maintenance area;
obtain collection data of the gas device configured in the operation and maintenance area uploaded by the smart gas indoor device object sub-platform through the smart gas sensor network platform, and determining a gas-related feature of the operation and maintenance area based on the collection data;
determine a count of on-call personnel of the at least one operation and maintenance area based on the gas-related feature of the at least one operation and maintenance area, the target installation information, and the door-to-door service plan;
in response to a determination that there is at least one operation and maintenance area satisfying a preset scheduling condition, construct an area map based on relevant information of the at least one operation and maintenance area, wherein the area map includes a plurality of nodes and a plurality of edges, the nodes represent the at least one operation and maintenance area, and the edges represent a relationship between two connected nodes, features of each of the nodes include a count of on-call personnel of an operation and maintenance area corresponding to the node, features of each of the edges include a distance between two nodes connected by the edge and a weight value, the weight value is related to household features of the two nodes connected by the edge;
determine an initial scheduling capability value of each of the nodes in the area map, perform a plurality of rounds of iterative update on the initial scheduling capability value, wherein when the scheduling capability value being updated meets a preset end condition, the update ends, a scheduling capability value of each of the nodes is obtained, the scheduling capability value reflects an ability to dispatch operation and maintenance personnel to other operation and maintenance areas, and the plurality of rounds of iterative update include:
  in a first round: determining the initial scheduling capability value of each of the nodes in the area map, and a scheduling capability value to be updated of each of the nodes is the initial scheduling capability value of each of the nodes in the area map; and
  in a $t^{th}$ round (t being larger than 1): updating the scheduling capability value to be updated of each of the nodes based on a preset algorithm, using an updated scheduling capability value of each of the nodes in the $t^{th}$ round as a scheduling capability value to be updated of each of the nodes in a $(t+1)^{th}$ round, wherein an updated scheduling capability value of a node in the $t^{th}$ round is determined based on an updated scheduling capability value of the node in the $(t-1)^{th}$ round, a change value between an updated scheduling capability value of a node connected to the node and a scheduling capability value before update of the node connected to the node, and a feature of an edge connected the node;
based on the scheduling capability value of the at least one operation and maintenance area, determining a real-time scheduling instruction and issuing the real-time scheduling instruction to the smart gas indoor installation engineering object sub-platform for execution, the real-time scheduling instruction including scheduling arrangement for on-call personnel in different operation and maintenance areas, and the scheduling arrangement including sorting scheduling capability values of neighboring areas from high to low, and dispatching a corresponding count of on-call operation and maintenance personnel from the neighboring areas to an area to be scheduled according to an order from high to low, until the count of on-call operation and maintenance personnel in the area to be scheduled meets a preset count; and
in response to compensation time off information uploaded by the smart gas indoor installation engineering object sub-platform, updating the scheduling capability value of the at least one operation and maintenance area, and adjusting the real-time scheduling instruction.

9. The system according to claim 8, wherein the smart gas operation management platform is further configured to:
  determine a user requirement based on the target installation information; and determine the door-to-door service plan based on the user requirement and an updated operation and maintenance personnel scheduling condition.

10. The system according to claim 8, wherein the smart gas operation management platform is further configured to:
determine, based on the user requirement and the operation and maintenance personnel scheduling condition, the distribution of the count of requirements per unit time for gas installation and the distribution of the count of services per unit time e; and
determine the overall service intensity based on the distribution of the count of requirements per unit time and the distribution of the count of services per unit time.

11. The system according to claim 8, wherein the smart gas operation management platform is further configured to:
determine an average waiting queue length based on the overall service intensity and a total count of operation and maintenance personnel through a preset algorithm;
forme a service score of the operation and maintenance personnel based on the overall service intensity and the average waiting queue length; and
in response to the service score being smaller than a score threshold, increase the total count of the operation and maintenance personnel until the service score is greater than or equal to the score threshold.

12. The system according to claim 9, wherein the smart gas operation management platform is further configured to:
determine, based on the user requirement and the operation and maintenance personnel scheduling condition, overall service intensity of the Internet of Things system;
determine an average waiting time based on the overall service intensity;
queue users based on user-expected door-to-door times and the average waiting time, including:
  in response to a determination that the user-expected door-to-door times are smaller than or equal to the average waiting time, queuing the users in an order of the user-expected door-to-door times;
  in response to a determination that the user-expected door-to-door times are greater than the average waiting time, queuing the users in an order in which the users submit user requirements; and
determining the door-to-door service plan based on a queuing result.

13. The system according to claim 8, wherein the smart gas operation management platform is further configured to:
determine, based on the gas-related feature of the at least one operation and maintenance area, an alert vector of the at least one operation and maintenance area, the alert vector including a leakage alert value; and
determine the count of on-call personnel of the at least one operation and maintenance area based on the alert vector of the at least one operation and maintenance area, the target installation information, and the door-to-door service plan.

14. The system according to claim 13, wherein the smart gas operation management platform is further configured to:
determine a gas cut-off alert value of the at least one operation and maintenance area based on a gas facility feature of the at least one operation and maintenance area, wherein the gas facility feature includes a type of a gas meter and a wear degree of a wiring.

15. The method according to claim 1, wherein the smart gas operation management platform determines a loss function based on a weighted sum of a first difference and a second difference corresponding to at least one first training sample, weights of the first differences or the second differences corresponding to different first training samples is constructed based on a third difference, the first difference is a difference between the count of requirements per unit time output by the initial distribution prediction model and the average count of requirements per unit time in the first labels, the second difference is a difference between the count of services per unit time output by the initial distribution prediction model and the average count of services per unit time in the first labels, and the third difference is a difference between the count of requirements per unit time output by the initial distribution prediction model and the count of services per unit time output by the initial distribution prediction model.

16. The method according to claim 1, wherein determining the initial scheduling capability value of each of the nodes in the area map includes:
determining the initial scheduling capability value of each of the nodes in the area map based on a ratio between a count of on-call operation and maintenance personnel for a node i, and a degree of the node i, wherein the degree of the node i is determined based on a count of edges of nodes connected to the node i.

17. The system according to claim 8, wherein the smart gas operation management platform determines a loss function based on a weighted sum of a first difference and a second difference corresponding to at least one first training sample, weights of the first differences or the second differences corresponding to different first training samples is constructed based on a third difference, the first difference is a difference between the count of requirements per unit time output by the initial distribution prediction model and the average count of requirements per unit time in the first label, the second difference is a difference between the count of services per unit time output by the initial distribution prediction model and the average count of services per unit time in the first label, and the third difference is a difference between the count of requirements per unit time output by the initial distribution prediction model and the count of services per unit time output by the initial distribution prediction model.

18. The system according to claim 8, wherein to determine the initial scheduling capability value of each of the nodes in the area map, wherein the smart gas operation management platform is further configured to:
determine the initial scheduling capability value of each of the nodes in the area map based on a ratio between count of on-call operation and maintenance personnel for a node i, and a degree of the node i, wherein the degree of the node i is determined based on a count of edges of a node connected to the node i.

* * * * *